(12) United States Patent
Tanaka

(10) Patent No.: US 7,207,482 B2
(45) Date of Patent: Apr. 24, 2007

(54) METHOD AND SYSTEM FOR PROVIDING SERVICES TO A PORTABLE ELECTRONIC DEVICE VIA A TERMINAL DEVICE THAT HANDLES THE PORTABLE ELECTRONIC DEVICE

(75) Inventor: Yoko Tanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 860 days.

(21) Appl. No.: 09/977,218

(22) Filed: Oct. 16, 2001

(65) Prior Publication Data

US 2002/0194349 A1 Dec. 19, 2002

(51) Int. Cl.
*G06F 13/00* (2006.01)

(52) U.S. Cl. ...................................... 235/382

(58) Field of Classification Search ................ 709/213, 709/220; 705/65, 66, 12; 235/375, 380, 235/492
See application file for complete search history.

(56) References Cited

U.S. PATENT DOCUMENTS

| | | | |
|---|---|---|---|
| 5,864,830 A | 1/1999 | Armetta et al. | |
| 5,875,432 A | 2/1999 | Sehr | |
| 6,081,793 A * | 6/2000 | Challener et al. | 705/50 |
| 6,199,752 B1 * | 3/2001 | Bornemann et al. | 235/375 |
| 6,359,699 B1 * | 3/2002 | Yoneta et al. | 358/1.16 |
| 6,446,192 B1 * | 9/2002 | Narasimhan et al. | 712/29 |
| 6,644,553 B1 * | 11/2003 | Ohki et al. | 235/492 |
| 6,834,341 B1 * | 12/2004 | Bahl et al. | 713/156 |
| 2002/0147912 A1 * | 10/2002 | Shmueli et al. | 713/182 |
| 2003/0208395 A1 * | 11/2003 | McClure et al. | 705/12 |

FOREIGN PATENT DOCUMENTS

| | | |
|---|---|---|
| EP | 0 949 595 A2 | 10/1999 |
| FR | 2 777 673 | 10/1999 |

\* cited by examiner

*Primary Examiner*—Robert B. Harrell
(74) *Attorney, Agent, or Firm*—Pillsbury Winthrop Shaw Pittman, LLP

(57) ABSTRACT

A service providing method to provide services to a holder of a portable electronic device through a terminal device handling a portable electronic device based on a portable electronic device having a memory area storing application data relative to the service provision, in which at least individual data of a holder is pre-stored by a prescribed organization. According to this service providing method, when a direction for the download of applications is received from a terminal device, justifiability of the portable electronic device is checked based on the data stored in the portable electronic device, and when justifiability of the portable electronic device is confirmed, the application information desired by a holder is read from memory area, the downloading of the application to the portable electronic device is directed to the terminal device and the read application data is transmitted.

20 Claims, 24 Drawing Sheets

| NEW MUSICS OF THIS WEEK |
|---|
| MUSIC A |
| MUSIC B |
| MUSIC C |
| ... |

FIG.28A

| LIST OF NEW MUSICS PREFERRED BY USER X |
|---|
| MUSIC D |
| MUSIC M |
| MUSIC A |
| ... |

FIG.28B

AFTER CHECKING MEMBER DATA

| DISTRIBUTION FORMS | PRICES |
|---|---|
| PURCHASE | 7 0 0 YEN |
| RENTAL(ONE MONTH) | 3 0 0 YEN |
| RENTAL(ONE WEEK) | 1 0 0 YEN |

FIG.29

METHOD AND SYSTEM FOR PROVIDING SERVICES TO A PORTABLE ELECTRONIC DEVICE VIA A TERMINAL DEVICE THAT HANDLES THE PORTABLE ELECTRONIC DEVICE

CROSS-REFERENCE TO RELATED APPLICATIONS

This application is based upon and claims the benefit of priority from the prior Japanese Patent Application No. 2001-174964, filed on Jun. 11, 2001, the entire contents of which are incorporated herein by reference.

BACKGROUND OF THE INVENTION

1. Field of the Invention

The present invention relates to a service providing method and a service providing system from which a card specifying an individual can be easily obtained and plural applications can be loaded in a single card as desired by a user who holds the card.

2. Description of the Related Art

In recent years, individual specified cards that specify individuals who use such cards such as, for example, a financial card, a point service card (Loyalty card), and individual unspecified cards (general-purpose cards) that do not specify the individuals using the cards such as, for example, a pre-paid card, etc. have become widely known.

In order to acquire such an individual specified card especially, a user applies to a prescribed card issue organization for the issuance of a card. When it receives the application, the card issue organization sets individual data of that user in a card after confirming the identity of the user, and it becomes possible to issue a card.

In the case of the individual specified card, as individual data is set in the card, there is such a benefit that the justifiability of a card with a user (a card holder) can be ensured. However, as the card is issued only by an exclusive card issue organization, a user is required to apply to a card issue organization for the issuance of a card.

That is, in order to apply for the issuance of a card, it is necessary for a user to go to a prescribed place (for example, a location of the card issue organization) to make the application directly or to take such a troublesome step as to send personal data to a prescribed place. Further, it was indispensable for the card issue organization to take a troublesome step to confirm the identity of a user and send an issued card to a user.

Further, there are such problems as that a user is only able to choose services that are offered by one card within the range of services offered by a card issue organization and kinds of applications that can be loaded in a card is restricted. Moreover, the design of the card published can also be chosen only in the range of designs that are offered by a card issue organization.

As a result, when a user desires to receive respective services offered by different card issue organizations, a user has to apply for the issue of a card at each of the different card issue organizations and obtain respective cards from each of different card issue organizations. Therefore, there was also such a problem that the number of cards held by a user tends to increase.

Such a problem is also applicable to acquiring an individual unspecified card. That is, in the case of an individual unspecified card, there is a benefit that anybody is able to use a card simply when it is purchased, but there is also a disadvantage that the justifiability of a user cannot be confirmed because no individual data is set in a card. Further, as an individual unspecified card is issued by a different card issue organization than is an individual specified card, there is also such a problem that the number of cards tends to further increase.

In order to solve such problems, an IC card that is commonly usable for plural systems is disclosed in Japanese Patent Application No. (TOKU-KAI-HEI) 11-39445, wherein a system to download new applications in the IC card is also disclosed.

However, in Japanese Patent Application (TOKU-KAI-HEI) No. 11-39445, a system to initially download an application in an IC card by setting an installation key received from an application issuer system in an application downloading terminal that is installed at a separate place is disclosed. However, there was such a problem that this disclosed system required a user to perform steps at two stages and the user was burdened with a troublesome process.

BRIEF SUMMARY OF THE INVENTION

The present invention was made in view of the above points and it is an object to provide a service providing method and a service providing system that makes it easy to obtain an individual specified card and unload plural applications in a single card as desired by a card holder.

According to the embodiment of the present invention, there is provided a service providing method for providing services to a first portable electronic device holder via the terminal device that handles the portable electronic device, based on the first portable electronic device having a memory storing application data relative to the service provision and pre-storing individual data of a holder by a prescribed organization. The service providing method comprises: checking justifiability of the first portable electronic device based on the data stored in the first portable electronic device when the directive data for downloading the application is received from the terminal device; demanding the setting of a portable electronic device to download the application data when the first portable electronic device is confirmed to be justifiable; reading out application data desired by a holder from the memory when receiving data shows the completion of the setting of the first portable electronic device or a second portable electronic device differing from the first portable electronic device as a portable electronic device in which an application is downloaded; and transmitting the read application data to the terminal device by directing the download of the application to the portable electronic device that is set as described above.

Further, according to the embodiment of the present invention, there is provided a service providing system for providing services to a holder of the first portable electronic device via the terminal device handling the portable electronic device using the first portable electronic device to pre-store at least individual data of the holder by a prescribed organization. The service providing system comprises: means for storing application data relative to the provision of services; means for receiving the direction for downloading the application from the terminal device and various data transmitted from the holder; justifiability check means for checking the justifiability of the first portable electronic device based on the data stored in the first portable electronic device received by the receiving means when the download direction is received by the receiving means;

setting demand means for demanding the setting of a portable electronic device to download application data when the first electronic device is confirmed justifiable by the justifiability check means; means for reading application data desired by the holder from the storing means when data showing the completion of the setting of the first portable electronic device or the second electronic device differing from the first electronic device is received by the receiving means as a portable electronic device for downloading applications; and means for transmitting the application data read by the reading means by directing the download of the application for the set portable electronic device to the terminal device.

BRIEF DESCRIPTION OF THE DRAWINGS

FIG. 28 is an outline diagram showing the list of distribution services application to user;

FIG. 29 is an outline diagram showing the list screen regarding the distribution forms and prices accompanied with the service application;

DETAILED DESCRIPTION OF THE INVENTION

Figure 1:
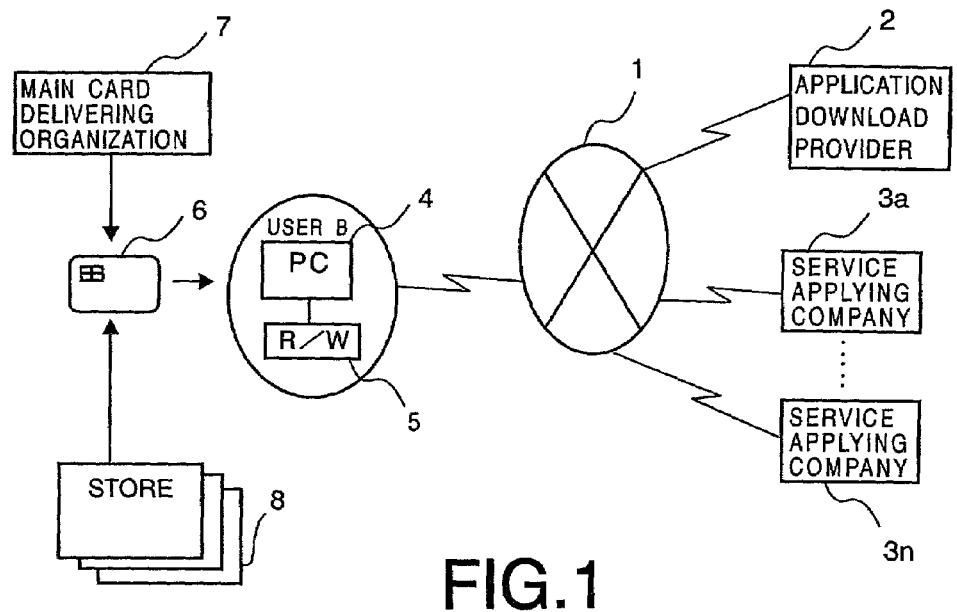
FIG. 1 is a conceptual diagram showing a card application download system in an embodiment of a service providing system of this invention.
Figure 2:
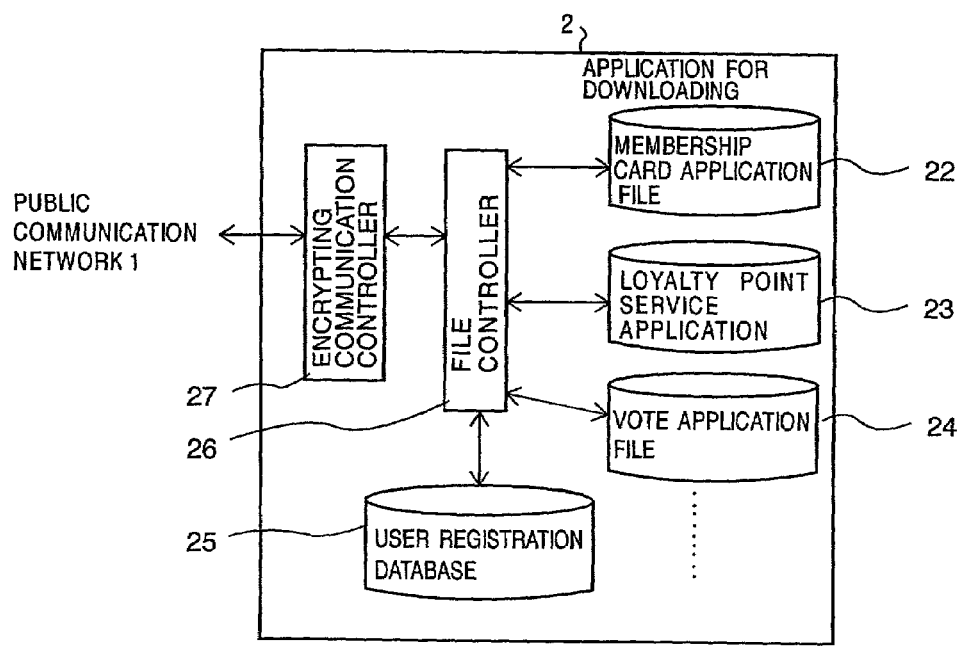
FIG. 2 is a schematic block diagram briefly showing the construction of an application download provider.

Preferred embodiments of the present invention will be described below in detail referring to the attached drawings.

An application download system A shown in FIG. 1 comprises a public communication network 1, for example, an internet, a public telephone network, ISDN, etc. which are connected with an application download provider 2, service applying company 3 (3a, . . . 3n), a personal computer (hereinafter referred to as a PC) at an end user side 4 and an IC card reader/writer (hereinafter, referred to as an IC card reader/writer).

An IC card 6 is set (inserted) on an IC card reader/writer 5 of a user B. The IC card 6 is distributed in advance as a main card that stores individual data of user B from a main card delivering organization 7 after confirming the identity of user B. This IC card may be an IC card that stores only initial data purchased by user B or delivered free of charge from a store.

As a main card distribution organization 7, public organizations or civil organizations such as a certification organization are considered.

The system A in FIG. 1, shown as the structure related to the explanation described later, is connected to a public communication network. However, actually many systems are connected to the public communication network 1 when necessary.

The application download provider 2 comprises plural application files 22, 23 and 24 that can be downloaded on the IC card 6, a user registration database 25 for storing individual data registered from user B, a file controller 26, and an encrypting communication controller 27.

Applications that can be downloaded on IC cards include a membership card application file for issuing a membership certificate for department stores and financial agencies, a loyalty point service application file 23 for receiving loyalty point services from stores, for example, department stores, super markets, etc., and a vote application file 24 for making on-line voting as described later.

These plural application files 22,23, 24 and the user registration data base 25 are connected to the file controller 26, which controls input/output of the files (plural application files 22, 23, 24 and the user registration database 24) according to the demands of user B.

The encrypting communication controller 27 decodes coded data transmitted from the outside or codes data to be transmitted to the outside. The file controller 26 is connected to the public communication network 1 via the encrypting communication controller 27.

Figure 3:
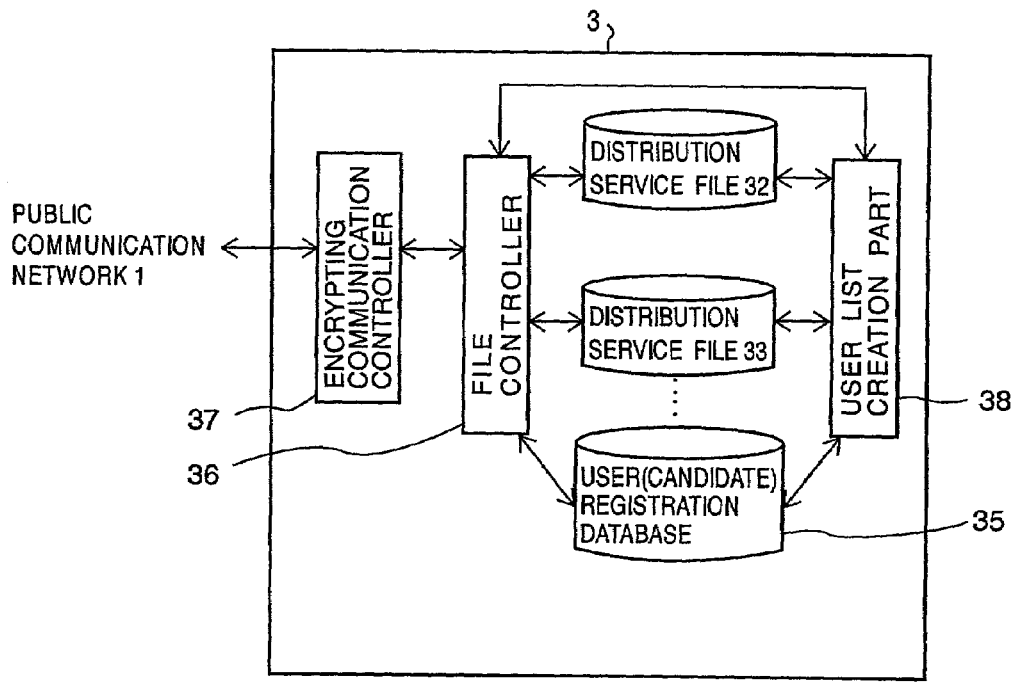
FIG. 3 is a block diagram schematically showing the construction of a service applying company.

The service applying company 3 (3*a*–3*n*) comprises a file controller 36, an encrypting communication controller 37, plural distribution service files 32, 33 which stores various distribution services that are provided to users, a user registration database 35 which stores individual data of registered users and a user list creation part 38 as shown in FIG. 3.

The distribution service files 32, 33 and the user registration database 35 are connected to the file controller 36. This file controller 36 controls the input/output of files according to the demand from user B.

The encrypting communication controller 37 decodes coded data transmitted from the outside and codes data to be transmitted to the outside. The file controller 36 is connected to the public communication network such as the internet, etc. via the encrypting communication controller 37.

The user list creation part 38 processes and edits distribution services based on individual data stored in the user registration database 35 under the control of the file controller 36.

Individual data of users who download related applications periodically or as required from the application download provider 2 is supplied to and stored in the user registration database 35.

Figure 4:
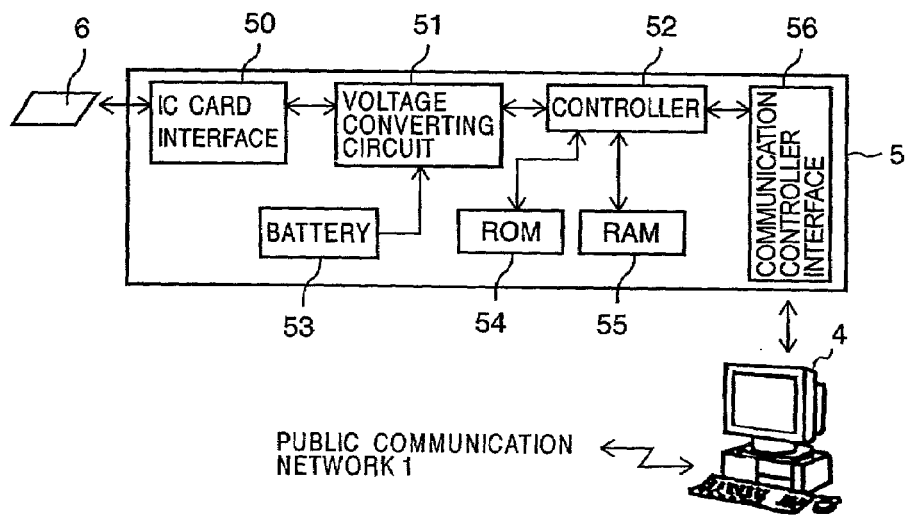
FIG. 4 is a block diagram of the schematic construction relative to PC and IC card reader/writer at the end user side.

FIG. 4 is a schematic block diagram relative to the end user B side of PC 4 and an IC card reader/writer and mainly shows the IC card reader/writer control block diagram. If connectable to the site of the application download provider 2 via the public communication network 1, PC 4 is sufficient, as described later, the explanation relative to PC 4 is omitted here. Further, when the IC card reader/writer 5 has a connecting function, PC 4 is not needed.

As shown in FIG. 4, PC 4 is so constructed that a privately owned PC is provided with the IC card reader/writer and is connectable to the public communication network 1. The IC card reader/writer is electrically connected to the IC card 6 via the contact portion of the IC card 6 described later. The IC card reader/writer 5 comprises an IC card interface (hereinafter referred to as IC card I/F portion) 50, a voltage converting circuit for IC card driving 51, a controller 52 that has a built-in CPU for the entire control, a battery 53 as a power source, a ROM 54 for storing a control program, etc., a RAM 55 as a memory that is used as a working memory, and a communication controller interface 56 for controlling communication of data with the PC 4.

Figure 5:
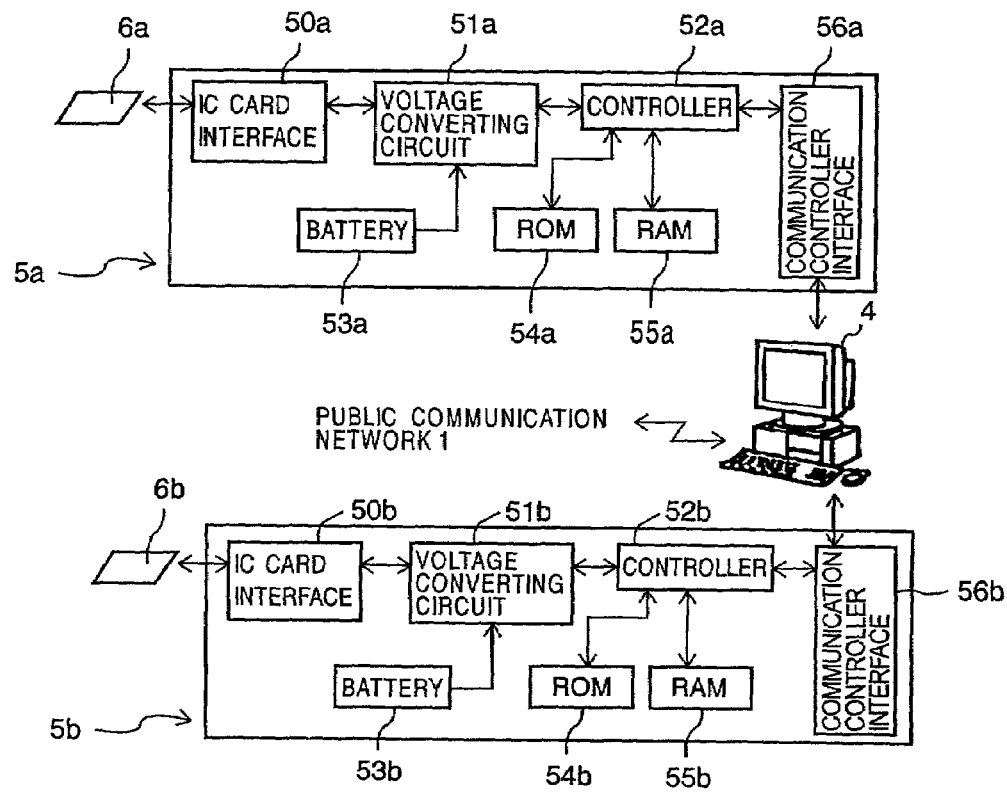
FIG. 5 is a block diagram showing a modified example of the construction relative to a PC and IC card reader/writer when treating 2 sheets of IC cards for PC.
Figure 6:
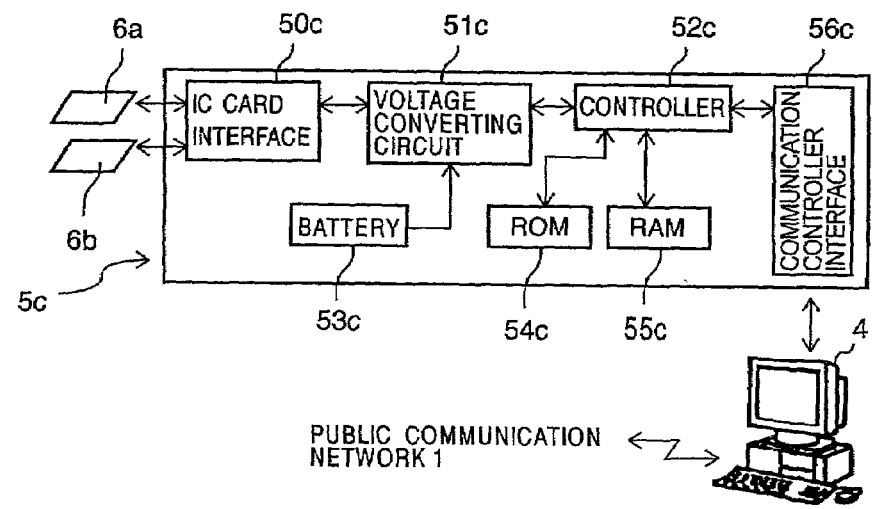
FIG. 6 is a block diagram showing a modified example of the construction relative to a PC and IC card reader/writer when handling 2 sheets of IC cards for PC.

FIG. 5 and FIG. 6 show a modified example of the IC card reader/writer shown in FIG. 4 and a structure for when handling 2 IC cards for the PC 4. FIG. 5 shows an example of the structure with two units of IC card reader/writer 5 connected to the PC 4 as two IC cards are treated. FIG. 6 shows an example of the structure with one unit of an IC card reader/writer provided with two insert ports so as to treat 2 sheets of IC card 6*a* and 6*b* connected to the PC 4.

Figure 7:
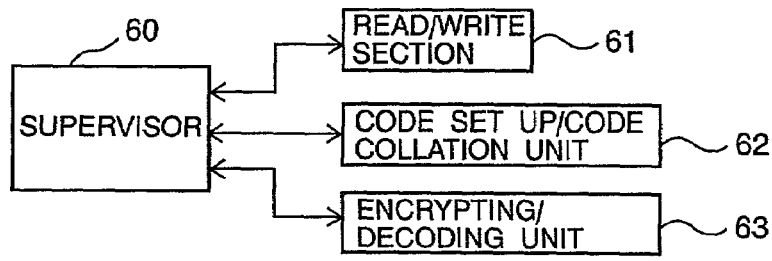
FIG. 7 is a block diagram briefly showing IC card functions.

As shown in FIG. 7, the IC card 6 comprises a read/write section 61, such portions to execute the basic functions of a code set up/code collation unit 62 and an encrypting/decoding unit 63, and a supervisor 60 that controls these basic functions.

The read/write section 61 reads/writes data from/to a data memory, etc. or erases data. The code setup/code collation unit 62 performs the storing and readout prohibiting process of a code number that is set by a user, and after setting a code number, collates that code number with a code number that is input from an external device and approves the subsequent process. The encrypting/decoding unit 63 performs the encrypting/decoding for preventing leakage and forging of communication data exchanged between the IC card reader/writer 5 and the IC card 6. A supervisor 60 decodes a command code input from the IC card reader/writer 5 or a command code added to data for executing a program.

Figure 8:
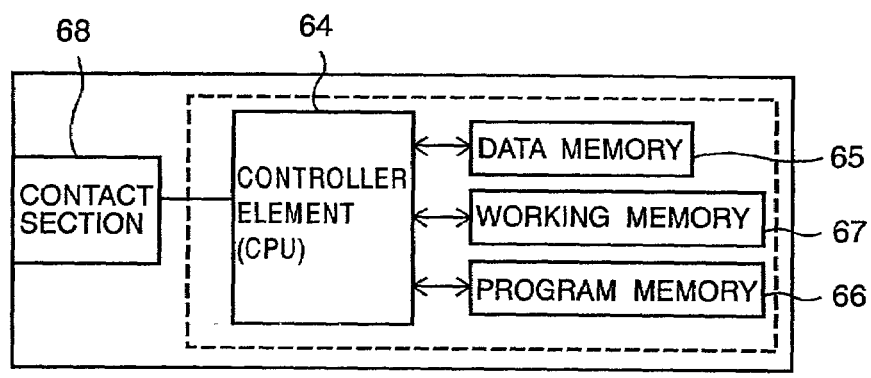
FIG. 8 is a block diagram briefly showing IC card control.

As shown in FIG. 8, in order to display various functions as shown in FIG. 7, the IC card 6 comprises a controller element 64 such as a CPU, a data memory 65 that is a storage means, a program memory 66, a working memory 67 and a contact section 68 for the electrical contact with the IC card reader/writer 5.

The controller element 64, the data memory 65, the program memory 66 and the working memory 6 are composed of a single IC chip (or multiple IC chips), respectively and embedded in the IC card body.

The program memory 66 is made of, for example, a mask ROM that stores a control program of the controller element 64 provided with a subroutine to realize basic functions as described above. Further, this memory has a function to download an application program.

The data memory 65 is used for storing applications and data and is composed of, for example, such erasable nonvolatile memory as EEPROM. The working memory 67 is a working memory for temporarily holding process data when the controller element 64 executes the process and is composed of, for example, a volatile memory such as RAM, etc.

Figure 9:
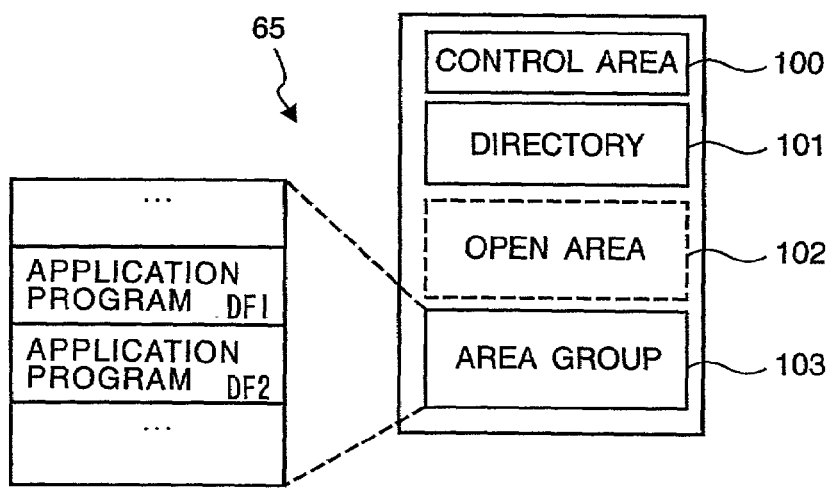
FIG. 9 is a map showing the internal structure of IC card data memory.

The data memory 65 is divided into a control area 100, a directory 101, an open area 102 and an area group 103 as shown in FIG. 9. The area group 103 is able to have plural data areas and key areas. Further, the area group 103 can be formed based on a concept called a data file (DF), and various downloaded application programs are grouped and stored for each DF.

Figures 10, 11:
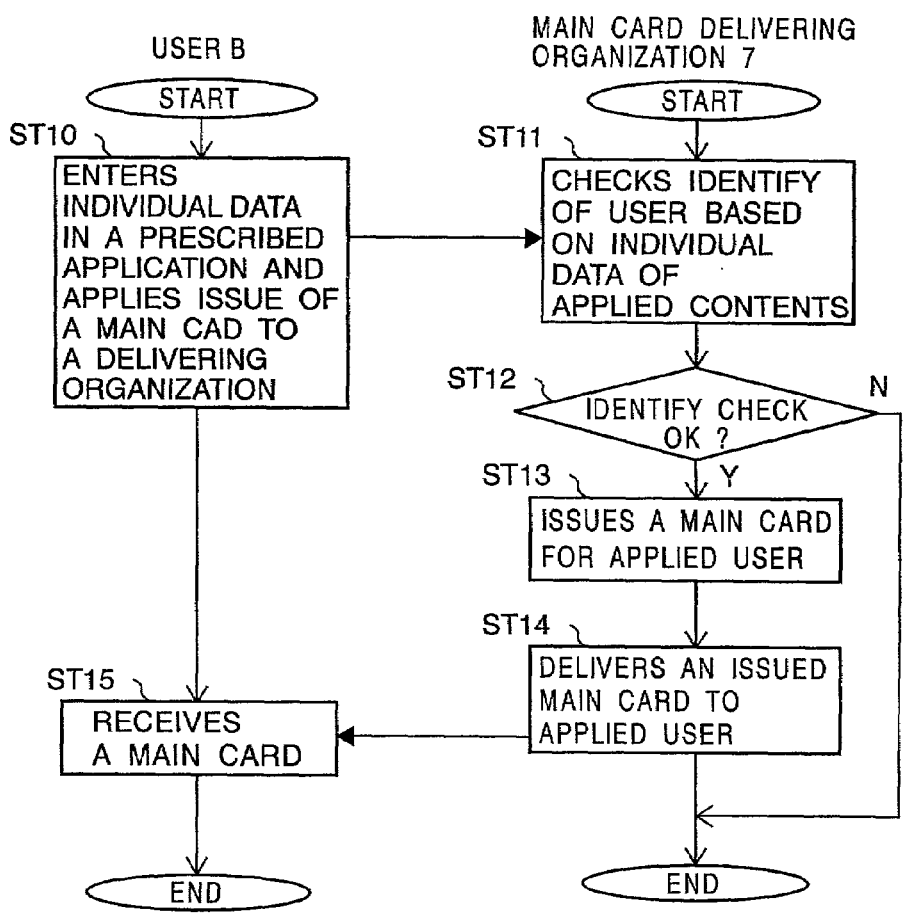
FIG. 10 is a map showing a table relative to individual data stored in EEPROM of an IC card.
FIG. 11 is a flowchart for explaining a master card providing method to a user who is a card carrier.

Individual data relative to a holder of the IC card 6 is stored in the EEPROM 65 as shown in FIG. 10. For example, such data as a person's name (Hanako Toshiba) 103*a*, a date of birth (1970 Mar. 3) 103*b*, a management number (98765) 103*c*, a phone number (02-1234-5678) 103*d*, a certification data 103*e*, a term of validity (2001 Mar. 31) 103*f*, a card identification data (00001) 103*g*, etc. are stored in this EEPROM 65.

An acquiring (offering) route of the IC card 6 to a user B for use in the card application download system thus composed will be described referring to FIG. 11–FIG. 18. Further, in this embodiment, an IC card in which individual data of a card holder is pre-stored is called a main card 6*a* and an initialized IC card is called an affiliated card 6*b*.

As shown in FIG. 11, user B enters individual data into a prescribed application form and applies for the issuance of a main card from a card issuing organization (ST10). Upon receipt of the application from user B, a main card delivering organization 7, checks the identity of user B based on the individual data contained in the application (ST11).

When the identity of the user is confirmed as a result of the confirmation in Step 11 (ST12: YES), the main card 6a is issued based on the contents of the application (ST13) and delivered to the user (ST14). Thus, User B is able to receive (acquire) the main card 6a that stores this own individual data (ST15).

Figure 12:
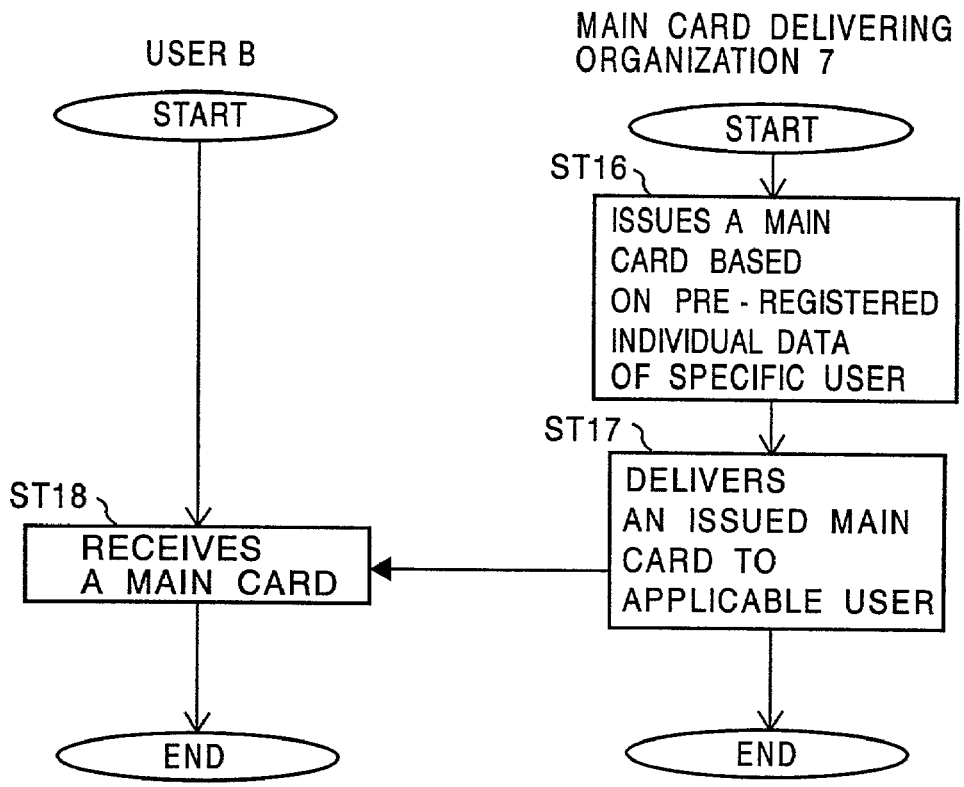
FIG. 12 is a flowchart for explaining a master card providing method to a user who is a card carrier.

As shown in FIG. 12, the main card delivering organization 7 issues the main card 6a (ST16) based on the individual data of a specific user pre-registered with a public organization and delivers it to User B (ST17). Thus, User B is also able to receive (acquire) the main card 6a storing this own individual data (ST18).

Next, FIG. 13–FIG. 18 are diagrams for explaining how to acquire (purchase) an affiliated card 6b by user B (a card holder).

Figure 13:
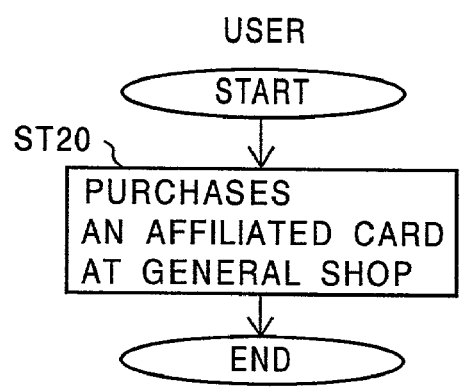
FIG. 13 is a flowchart for explaining an affiliated card acquiring (purchasing) method by a user who is a card carrier.
Figure 14:
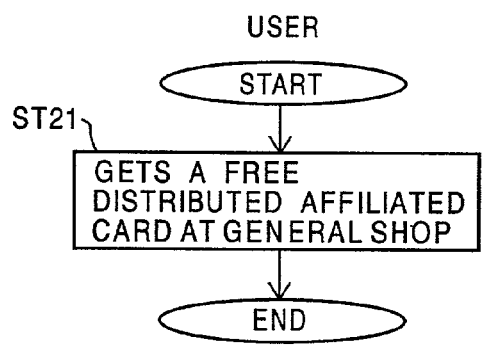
FIG. 14 is a flowchart for explaining an affiliated card acquiring (purchasing) method by a user who is a card carrier.

There are two routes to acquire an affiliated card as shown in FIG. 13 and FIG. 14. For example, the acquisition route shown in FIG. 13 is to purchase an affiliated card 6b for sale at a store by User B as shown in FIG. 15 (ST20).

Figure 15:
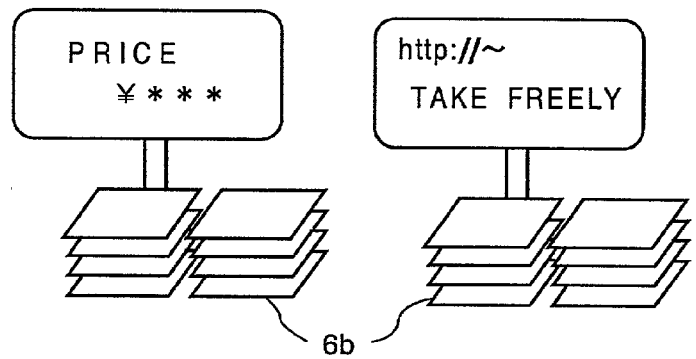
FIG. 15 is a flowchart for explaining an affiliated card acquiring (purchasing) method by a user who is a card carrier.

The acquisition route shown in FIG. 14 is to get an affiliated card 6b placed in a shop for free distribution as shown in FIG. 15 (ST21).

Figure 16:
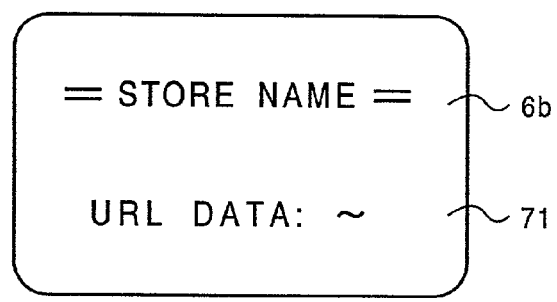
FIG. 16 is a front view showing the surface of an IC card for free charge delivering.
Figure 17:
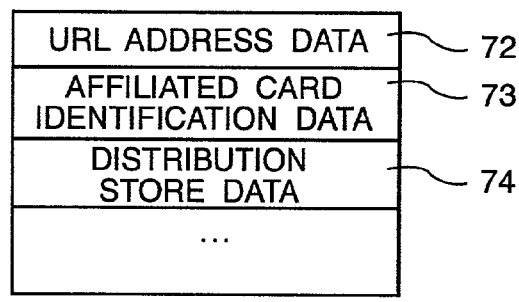
FIG. 17 is a map showing data stored in an internal memory of an IC card for free charge delivering.

This free distribution IC card has the URL address data of a specific home page pre-stored on its surface or in an internal memory as shown in FIG. 16.

On the affiliated card 6b, advertising URL may be set so that it is referred to by a user for a fixed time based on the URL address data stored in an internal memory when the affiliated card 6b is used in, for example, application downloading.

Further, an IC card supplier for the affiliated cards 6b gets earnings from such advertising charges and is able to distribute the cards at no charge.

Figure 18:
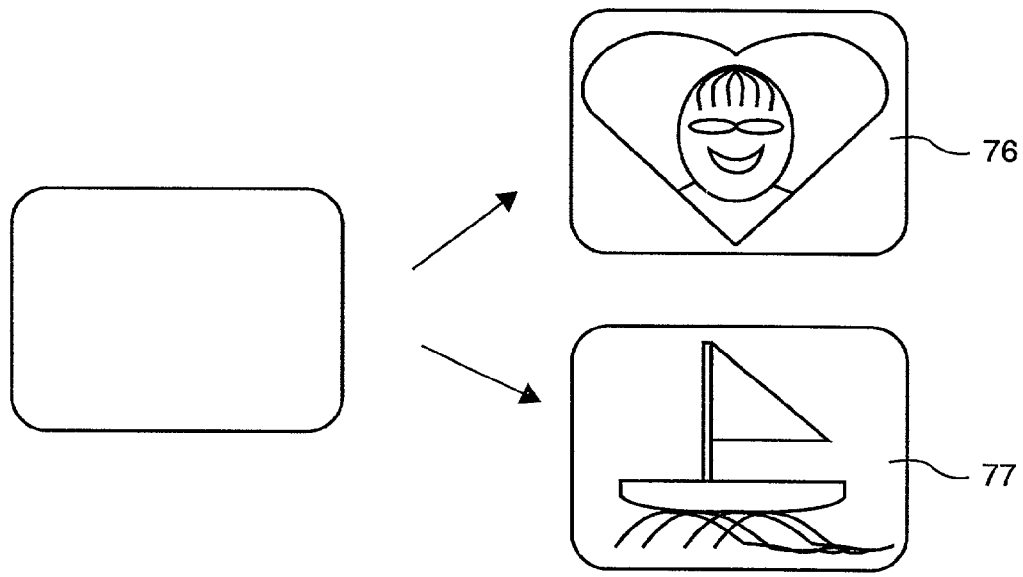
FIG. 18 is a diagram for explaining printing of the surface of an IC card purchased or delivered without charge.

User is able to print desired images, such as a character 77 and an own photograph 76, etc. on the surface of an IC card purchased or distributed no charge through the routes shown in FIG. 13 and FIG. 14 using a printer and to customize the card surface as desired as shown in FIG. 18.

Next, the outline of download processing of the application to an IC card will be explained using FIG. 19–FIG. 21.

In this embodiment, a desired application is downloaded to the IC card using the user owned PC 4 and the IC card reader/writer 5, and the individual data of user B for using the application to an application provider and the IC card.

Figure 19:
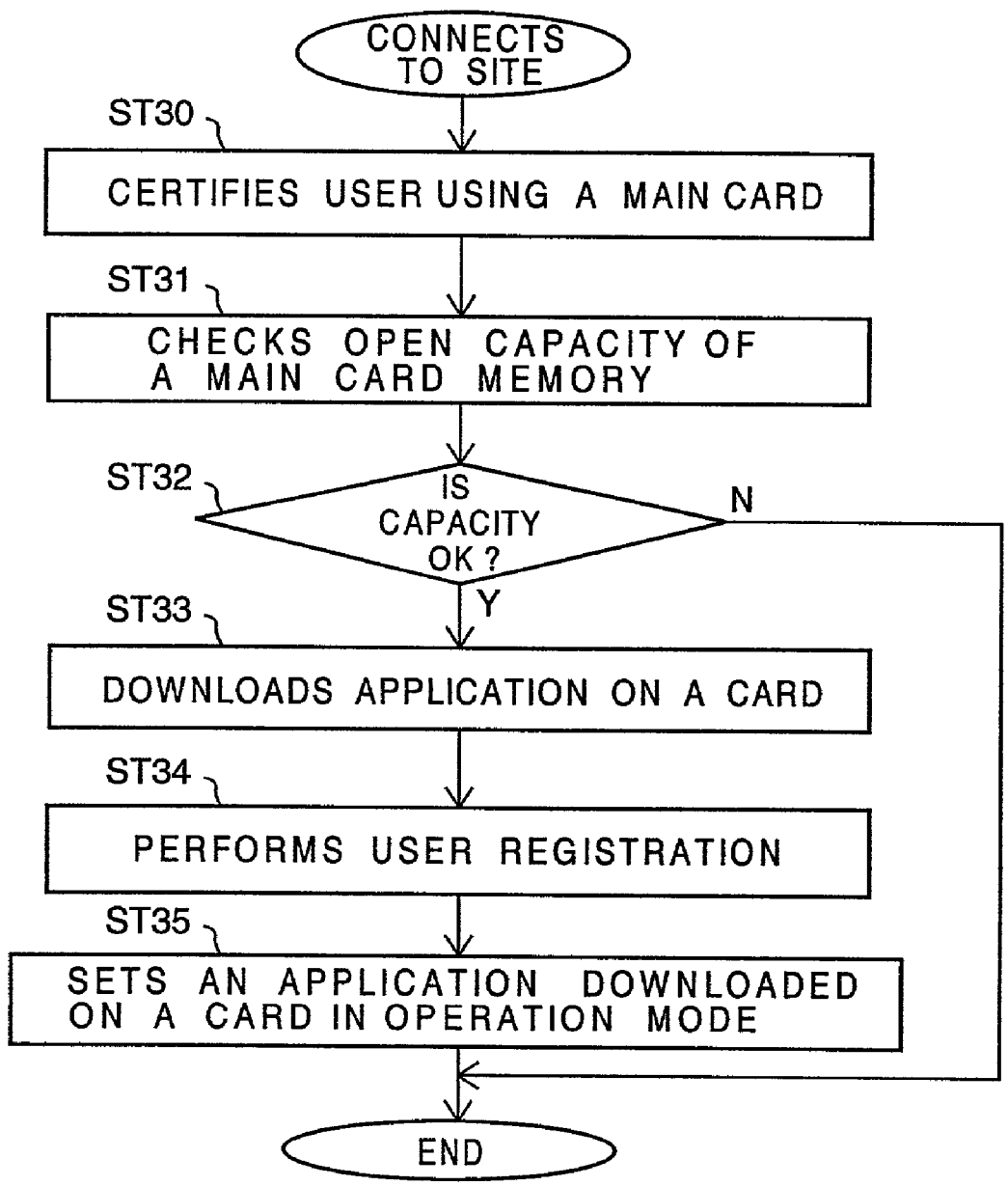
FIG. 19 is a flowchart for explaining the outline of the application download process to an IC card.

As shown in FIG. 19, using his own PC 4, user B first accesses the site of the application download provider 2 for downloading an application, and executes the user authentication using the main card 6a that is set in the IC card reader/writer 5 (ST30).

When the user is properly authenticated, the open memory capacity of the main card 6 is checked to see if it is sufficient to download a desired application to the memory (ST31). When the open capacity is judged to be sufficient for download (ST32: YES), the download of the application to the main card 6a is executed (ST33).

When the download is normally completed, the user registration is executed to the download provider 2 (ST34). After completing the user registration normally, the application is downloaded to the main card 6a is set to the operation mode and the usable state. Thus, the application downloading process is completed (ST35).

Next, the operation between the PC 4 of user B and a provider relative to the application downloading on the IC card explained in FIG. 19 will be described referring to FIG. 20 and FIG. 21. In this embodiment, an application program is downloaded on the main card 61.

Figure 20:
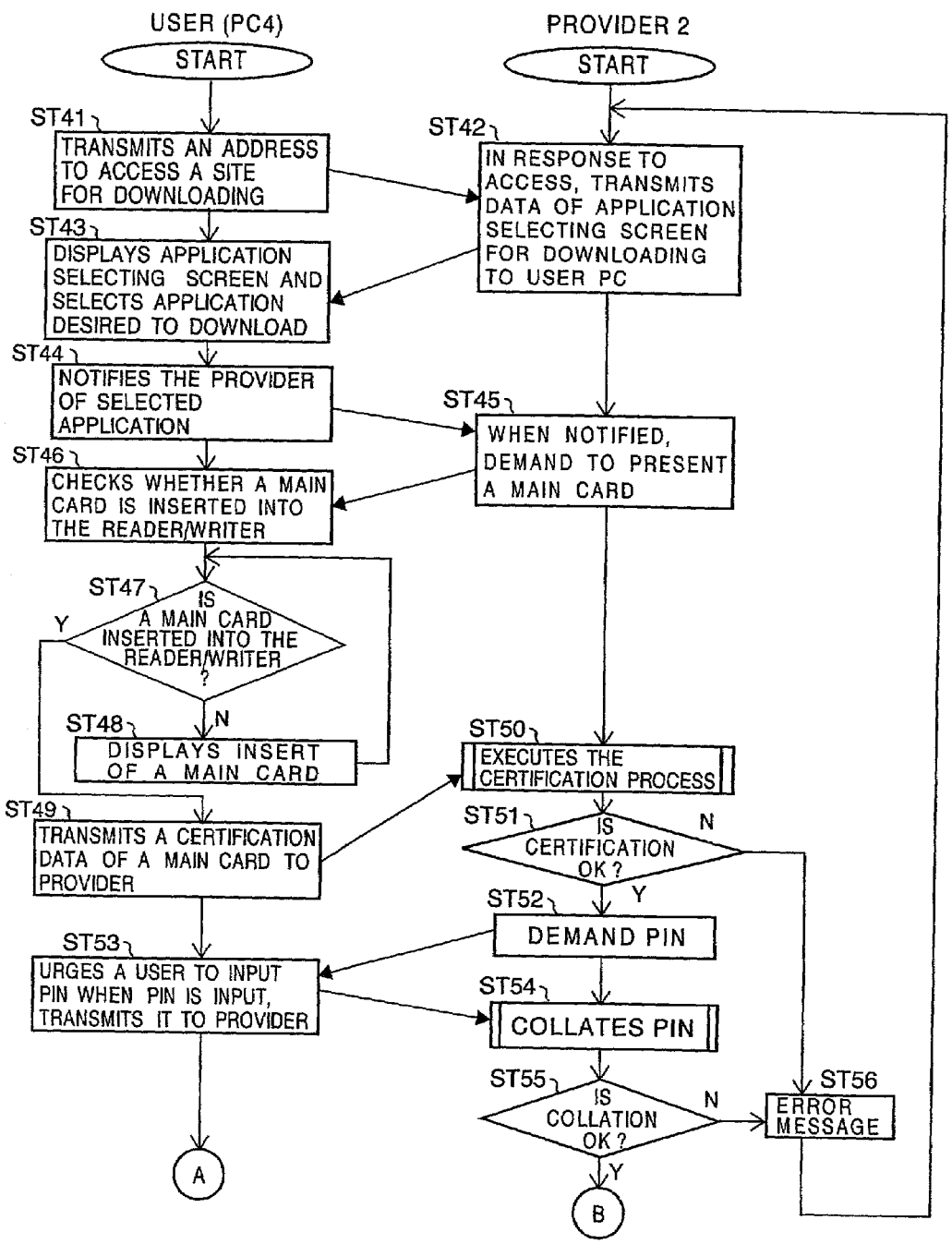
FIG. 20 is a flowchart for explaining the operation between a user's PC and a provider regarding the application download process to an IC card.
Figure 21:
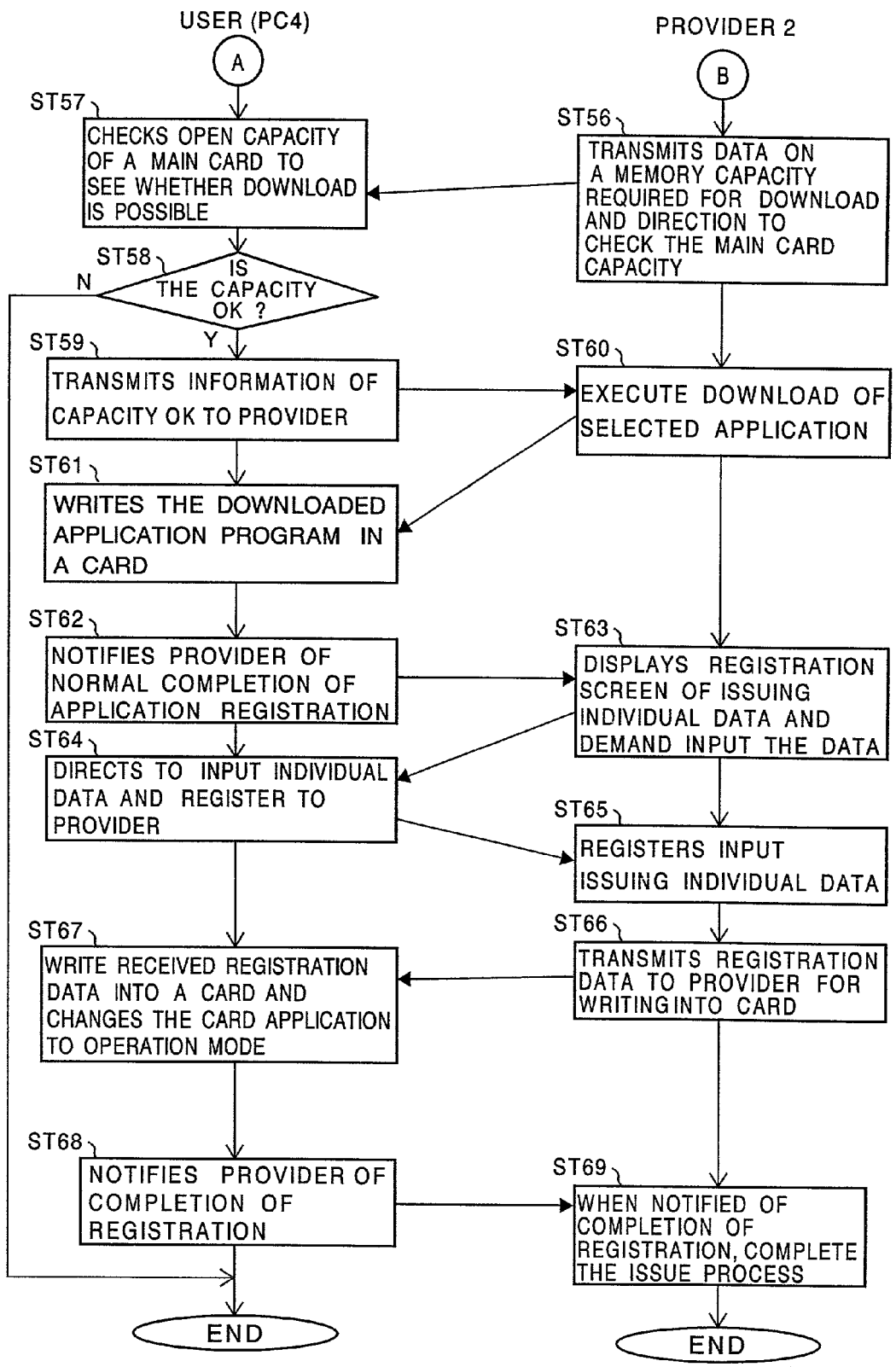
FIG. 21 is a flowchart for explaining the operation between a user's PC and a provider regarding the application download process to an IC card.

As shown in FIG. 20, first user B accesses the site of the application download provider 2 for downloading an application using his own PC 4 (ST41). The file controller 26 transmits an application selecting screen data for download to the PC 4 in response to the access from the PC 4 (ST42).

Figure 25:
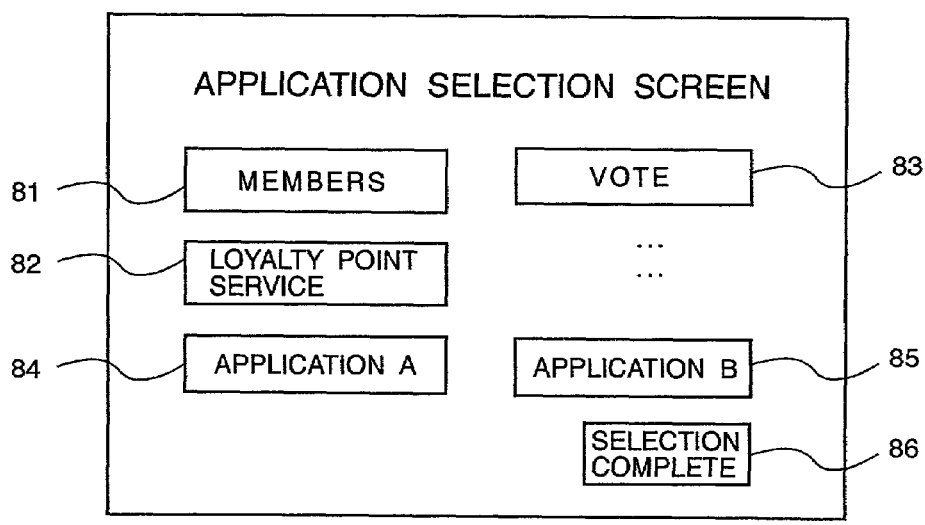
FIG. 25 is a front view showing the download application selection screen.

As shown in FIG. 25, the PC 4 displays the received data for downloading an application selecting screen on a display, and urges selection of an application desired to be downloaded. On this selection screen, plural application names 81–85 that can be downloaded and a key 86 to direct the selection are displayed.

On the application selection screen in this embodiment, there are arranged a "Members" key 81 for selecting a membership card application, a "Loyalty point service" key 82 for selecting the loyalty point service application, a "Vote" key 83 for selecting the vote application, and a "Selection complete" key 86 for directing the completion of the selection.

User B selects the key for the application desired to be downloaded from these displayed application selection screens and, lastly depresses the "Selection complete" key 86 (ST43). When the "Selection complete" key 86 is depressed, the PC 4 will notify the provider 2 (ST44) of the information indicating the selected application name.

Further, it is also possible to select plural applications at a time.

When the notice of the selected application is received from the PC 4, the provider 2 demands the PC 4 to present the main card 6a of user B 6a for the justifiability confirmation process (ST45). When the demand to present the main card 6a is received, the PC 4 checks whether the main card 6a is inserted into the connected (or built in) IC card reader/writer 5 (ST46).

When it is detected that the main card 6a was not inserted in Step ST46 (ST47: NO), the PC 4 displays a message showing the insertion of the main card to the User B on the display (ST48). When the main card 6a is inserted in Step ST46 (ST47: YES), the IC card reader/writer 5 reads out the stored authentication information from the main card 6a that is set therein, and transmits it to the provider 2 via the PC 4 (ST49).

When the authentication information is received from the PC 4, the file controller 26 of the provider 2 executes the authentication process relative to the main card 6a, and checks the justifiability of the main card 6a (ST50). When the main card 6a is judged not to be justifiable as a result of the check in Step ST50 (ST51: NO), the file controller 26 displays an error message (ST56) and returns to Step ST42.

When the main card 6a is confirmed to be justifiable in Step ST50 (ST51: YES), the file controller 26 of the provider 2 demands the PC 4 to present a PIN (Personal Certification Number) of user B (ST52) in order to confirm the individual justifiability of user B.

When the demand for presenting the PIN information is received, the PC 4 urges user B to input the PIN information. When the PIN information is input from the input portion of a keyboard (not illustrated) by user B, the PC 4 transmits the input PIN information to the provider 2 (ST53).

When the PIN information is received from the PC 4, the file controller 26 of the provider 2 executes the collation process relative to the PIN information and checks the individual justifiability of user B (ST54).

When user B is judged not to be justifiable as a result of the check in Step ST54 (ST55: NO), the file controller 26 displays an error message (ST56) and returns to Step ST42.

When user B is confirmed to be justifiable in Step 54 (ST55: YES), the file controller 26 of the provider 2 transmits the memory capacity data required for downloading selected applications and a direction for checking the capacity of the main card 6a to the PC 4 in Step ST44 (ST56).

When the direction for checking the capacity of the main card 6a is received, the PC 4 compares the open capacity of the main card 6a with the received required memory capacity data using the IC card reader/writer 5.

By this comparison, the PC 4 judges whether the application program selected by the set main card 6a can be downloaded (ST57).

When it is revealed that the download is not feasible as a result of the checking of the open capacity in Step ST57 (ST58: NO), a series of processing steps are suspended. Further, when judged that the download is possible(the open capacity is sufficient) (ST58: YES), the PC4 transmits a notification that the download is possible to the provider 2 (ST59).

When notified that the download is possible, the file controller 26 of the provider 2 executes the download of the selected application (ST60). Further, in the PC 4 the application program sent from the provider 2 is downloaded to the main card 6a that is set via the IC card reader/writer (ST61). When the program download is completed properly in Step 61, the PC 4 transmits the completion of the proper registration of the application to the provider 2 (ST62).

In this embodiment, the application downloaded in Step 61 cannot be used in this state. Therefore, when the application is properly downloaded, the file controller 26 of the provider 2 transmits the individual data registration screen (not shown) to the PC 4 and requests the input of individual data so that the application can be used (ST63).

The PC 4 displays the received individual data registration screen on the display and urges the input of individual data. When individual data required for the card issue is input through the input device (not shown)) by user B, the PC 4 transmits the input individual data to the provider 2 (ST64).

When the individual data is received, the file controller 26 of the provider 2 makes the user registration on a user registration database 25 (ST65). When the user registration is normally completed, the provider 2 transmits the registration data associated with the user registration to the PC 4 (ST66).

In the PC 4, when the registration data is received, the received registration data is written on the main card 6a set by the IC card reader/writer 5. When the registration data is written onto the main card 6a, the application program downloaded to the main card 6a is switched to the operation mode and the program becomes usable (ST67).

When the registration data is properly written on the main card 6a, the PC 4 notifies the provider 2 of the completion of the registration on the main card 6a (ST68). When the notice of completion of this registration is received, the provider 2 judges that the downloaded application issue process (the process to make it usable) is properly completed and terminates a series of download operations (ST69).

In this embodiment, the capacity check is carried out with the PC 4 of user B. However, this check is not restricted to this, as it can also be executed at the provider 2.

In this embodiment, an application desired by user is downloaded on a sheet of an IC card 6 by the user using his own PC 4. Accordingly, an individual is able to create a multi-application card easily.

Further, it is also no longer needed that a service applying company go to a prescribed issuing place in order to issue service applications as it can now provide services without geographical restriction.

Further, applications are downloaded on the main card 6a including individual data after it is authenticated. Further, the application downloaded on the card becomes usable only after individual data is registered. Therefore, applications can be downloaded on regular cards only and for service applying companies it is possible to prevent illegal download through illegal access.

Figure 22:
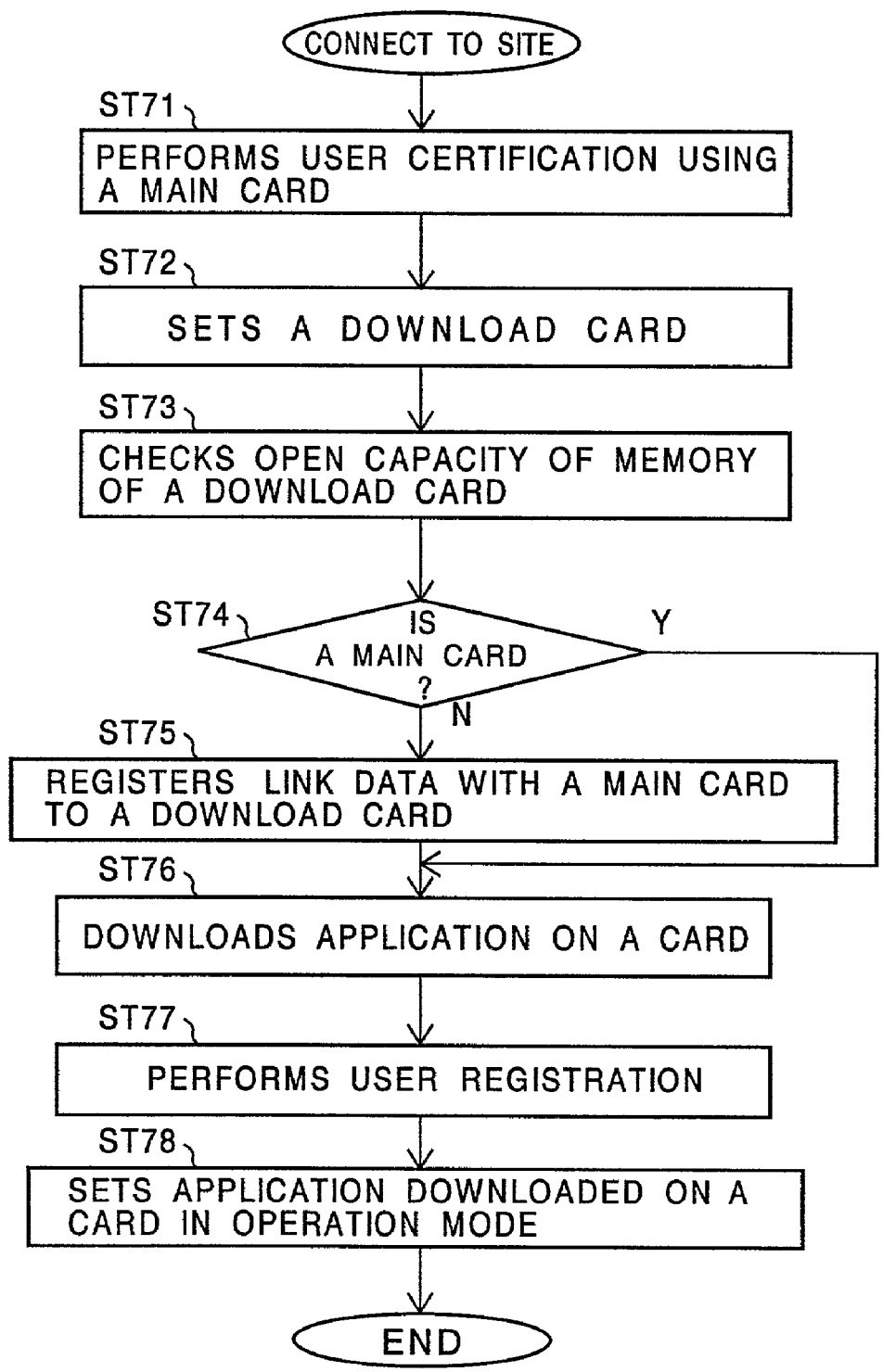
FIG. 22 is a flowchart for explaining a modified example of the application download process to an IC card.
Figure 23:
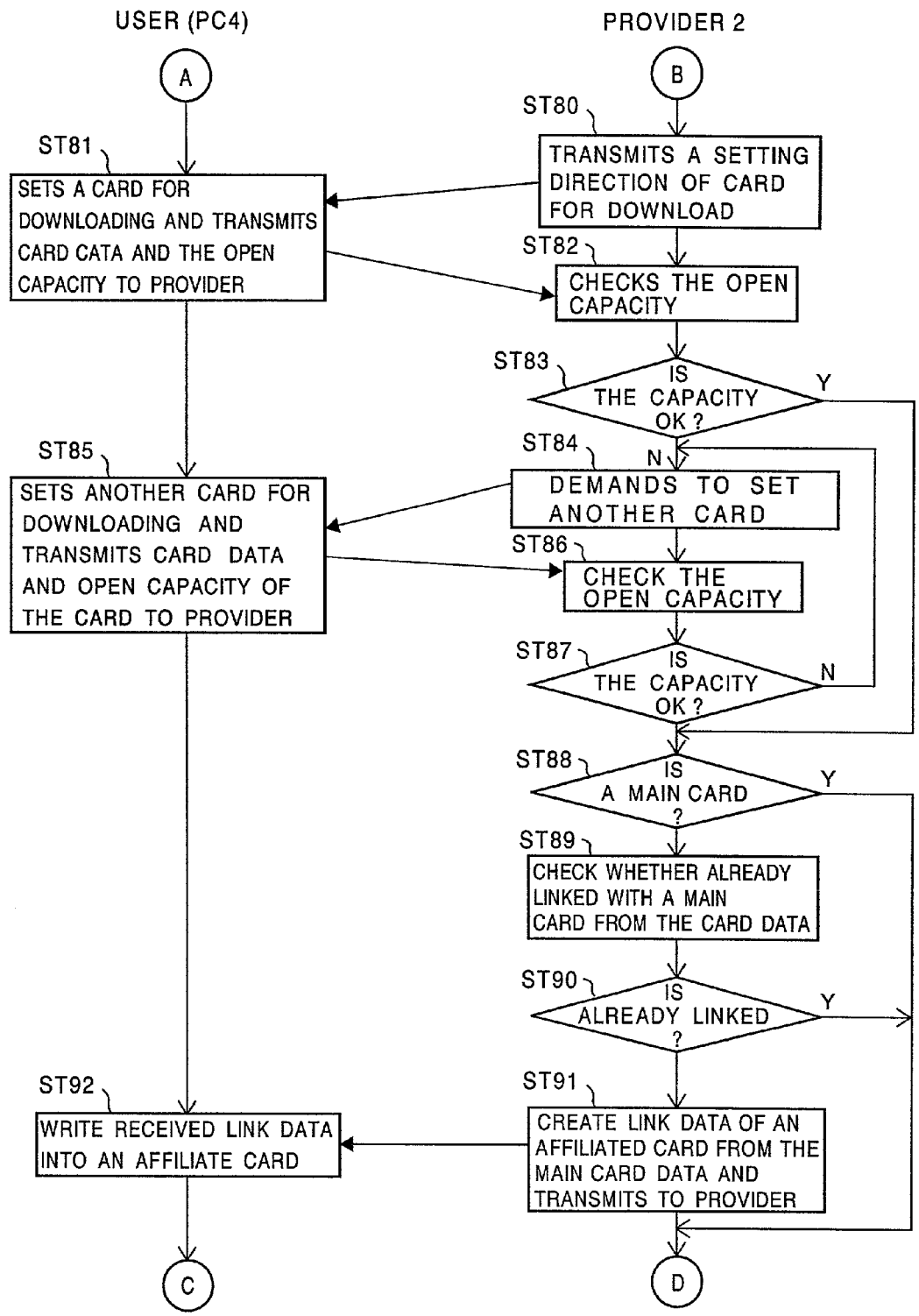
FIG. 23 is a flowchart for explaining the operation between a user's PC and a provider regarding a modified example of the application download process to an IC card.
Figure 24:
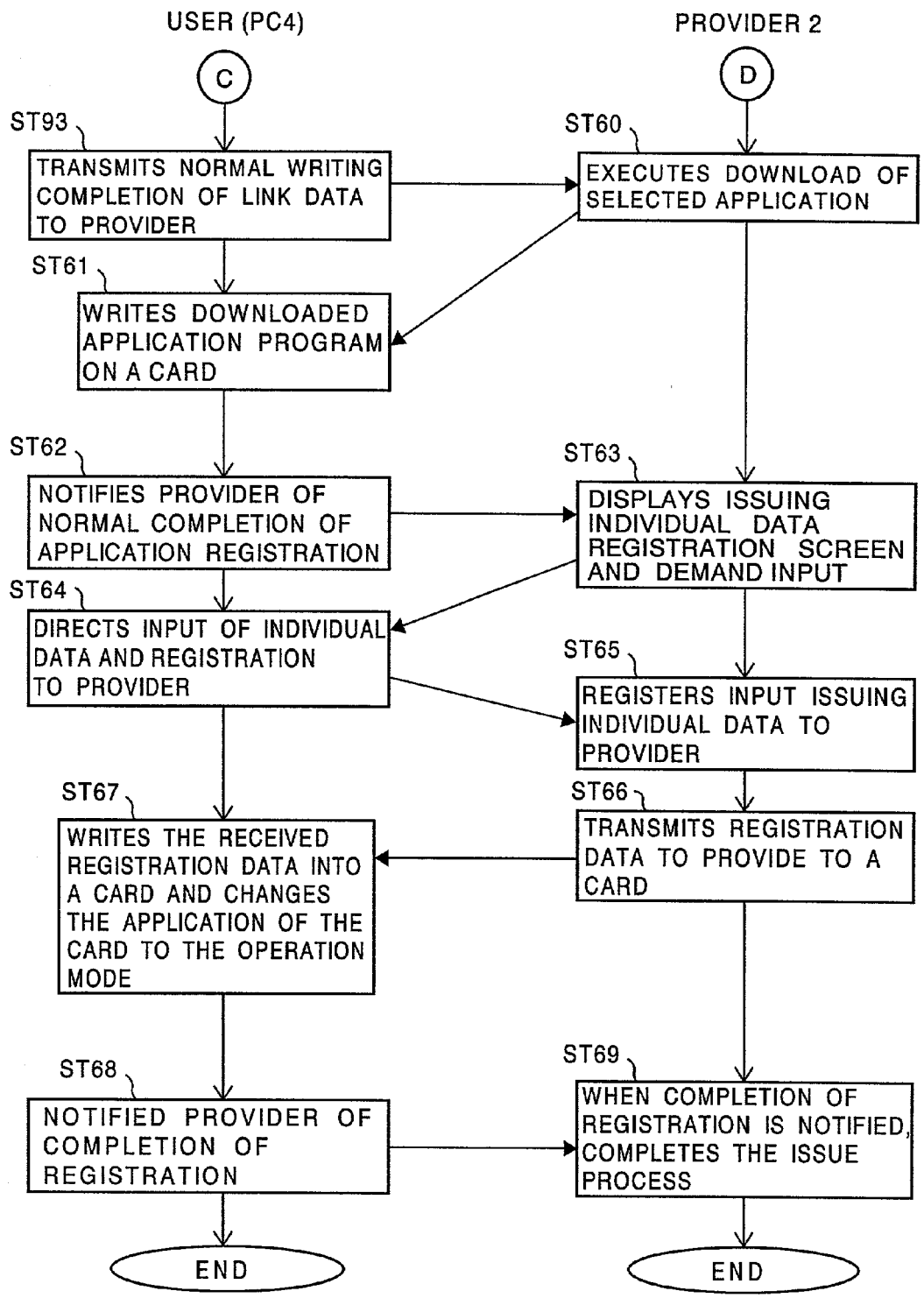
FIG. 24 is a flowchart for explaining the operation between a user's PC and a provider regarding a modified example of the application download to an IC card.

Next, the outline of the modified example of the application download process on an IC card is explained using FIG. 22–FIG. 24.

In this embodiment, as an IC card on which an application program is downloaded, the program is first downloaded on the main card 6a. Further, if an application program cannot be downloaded due to the insufficient open capacity of a memory of a main card, the program is downloaded on an affiliated card 6b. Further, it is also possible to set an affiliated card 6b from the beginning and download an application on the affiliated card 6b.

As shown in FIG. 22, user B first accesses the site of the application download provider 2 for downloading an application using his own PC 4, and executes the user authentication using the main card 6a that is set in the IC card reader/writer 5 (ST71).

When the user authentication is completed properly, a card on which an application is downloaded is set in the PC (ST72). When a card is set, the open capacity of a download memory of the IC card 6 is checked to see if a desired application can be loaded in the memory (ST73).

At this time, when the open capacity is judged sufficient for downloading, the kind of IC card 6 that is set for the downloading is determined. When it is the main card 6a, proceed to Step ST75. When the set IC card 6 is not the main card 6a, the link data of the main card 6a is registered on the IC card 6 on which the data is downloaded, and an affiliated card 6b is created (ST75).

In general, any information specifying individual data is not stored in general purpose IC cards that are available at a market or freely distributed. Even if stored, they are not registered with a legal organization. Accordingly, it is not possible to specify an owner of a general purpose IC card.

When false certification data (that is, the link data referred to in this embodiment) is created using such certification data, etc. of the main card 6a for specifying an individual who is registered with a legal organization and stored in such a general purpose IC card, it is possible to make it a card ensuring an owner similar to the main card 6a.

When an IC card (the main card 6a or the affiliated card 6b storing the link data with the main card 6a) is prepared in Steps ST74 and ST75, the downloading of an application is executed (AR76). When the downloading is normally completed, the user registration is made to the download provider 2 (ST77). When the user registration is completed normally, the application downloaded on the IC card 6 is set to the operation mode and the application is turned to the usable state, and the application downloading process is completed (ST78).

Next, the detailed operation between the PC 4 of user B and the provider 2 relative to the modified example of the application download process to an IC card explained in FIG. 22 will be described referring to FIG. 23 and FIG. 24. In this embodiment, an application is first downloaded on the main card 6a. Therefore, the process at first becomes the same as that shown in FIG. 20, and thus the explanation is omitted.

The site of the application download provider 2 is accessed, a desired application for download is selected, and when the certification process of the main card 6a and the collation process of user B are completed, it proceeds to the process shown in FIG. 23.

When justifiability of both the main card 6a itself and user B is confirmed (up to ST 55), the file controller 26 of the provider 2 demands the setting of an application downloading card in the PC 4 (ST80).

When the downloading card setting demand is received, the PC 4 indicates it on the display and urges user B to insert the card. When the IC card 6 is set, the IC card reader/writer 5 reads out the certification data and the open capacity data of the memory from the IC card 6 and transmits it to the provider (ST81).

When the open memory capacity data is received, the file controller 26 of the provider 2 compares the received memory open capacity with a memory capacity required for downloading an application selected in Step ST44 and judges whether it is possible to download the application program selected by the set IC card 6 (ST82 and ST83).

When the file controller 26 judges the download is possible in Step ST82 (ST83: YES), the operation goes to the process in ST88. When the download is judged to be not possible in Step ST82 (the open capacity is insufficient) (ST83: NO), the file controller 26 of the provider 2 transmits a demand to the PC 4 to set another card (ST84).

When the demand for setting another download card is made due to the insufficient memory capacity, the PC 4 indicates it on the display and urges user B to insert another card. When another IC card 6 is set, the IC card reader/writer 5 reads out the certification data and the open capacity of the memory from the set IC card and transmits them to the provider 2 (ST85).

When the data of the memory open capacity is received, the file controller 26 of the provider 2 compares the received memory open capacity with the memory capacity required for downloading the application selected in Step 44 and judges whether it is possible to download the selected application program on the set IC card 6 (ST86 and ST87).

When the download is judged not possible in Step ST86 (for insufficient open capacity) in Step ST86 (ST87: NO), the file controller 26 returns to the process in Step ST84 and transmits a setting request of another card again. Further, when the download is judged possible in Step ST86 (ST87: YES), the file controller 26 of the provider 2 judges whether the set IC card 6 is the main card 6a.

That is, when the IC card 6 that is set for the downloading is judged to be the main card 6a from the certification data received together with the open capacity data (ST88: YES), the file controller 26 proceeds to Step ST60 shown in FIG. 24. Further, when the IC card 6 is judged not to be the main card 6a in Step ST88 (ST88: NO), the file controller 26 checks whether the card is the affiliated card 6b already link processed with the main card 6a from the certification data (ST89).

When the set IC card 6 is judged to be the affiliated card 6b already link processed with the main card 6a in Step ST89 (ST90), the file controller 26 proceeds to Step ST60 shown in FIG. 24. Further, when it is judged not to be the link processed affiliated card 6B link processed in Step ST89 (ST90: NO), the file controller 26 creates the link data based on the certification data of the main card 6a that is already certified in Step ST50 and transmits it to the PC 4 (ST91).

When the link data is received from the provider 2, the PC 4 writes the link data on the IC card 6 set in the IC card reader/writer 5 and executes the link process of the affiliated card 6b (ST92). Then, when the link data writing is completed normally, the PC 4 so notifies the provider 2 (ST93).

Further, when the card that is set for the downloading is the main card 6a from the judgment in Step ST88 or the already link processed affiliated card 6b from the judgment in Step 91 or further, when the normal completion of the link data writing in Step ST93 is received, the file controller 26 of the provider 2 executes the downloading of the selected application (ST60–ST62). The process after Step ST60 is the same as that shown in FIG. 21 and therefore, the explanation is omitted.

That is, when the program downloads in Step ST60–ST62 are completed, individual data required for the card issuance is input by user B and the user registration to the provider 2 is executed (ST63–ST65). When the user registration is completed normally, the application program downloaded to the IC card 6 is set to the operation mode to make it usable (ST66–ST69).

In this embodiment, an application is downloaded not only to the main card 6a storing individual data but also on a general-purpose IC card 6. Accordingly, an individual person is able to create a multiple application card easily. Further, for service applying companies it becomes possible to provide many service applications on a single sheet of a card without restriction.

Further, false certification data (link data) is created using certification data of the main card 6a for specifying an individual registered with legal organizations, such as certification data of the main card 6a and stored in a general-purpose IC. For this reason, a general-purpose card can be made into a card which guarantees an owner like the main card 6a, and as application can be downloaded only on a legal or semi-legal card, the illegal downloads through illegal access can be prevented.

Next, the outline of the service offer processing using an IC card with a downloaded application will be explained using FIG. 26–FIG. 31.

Figure 26:
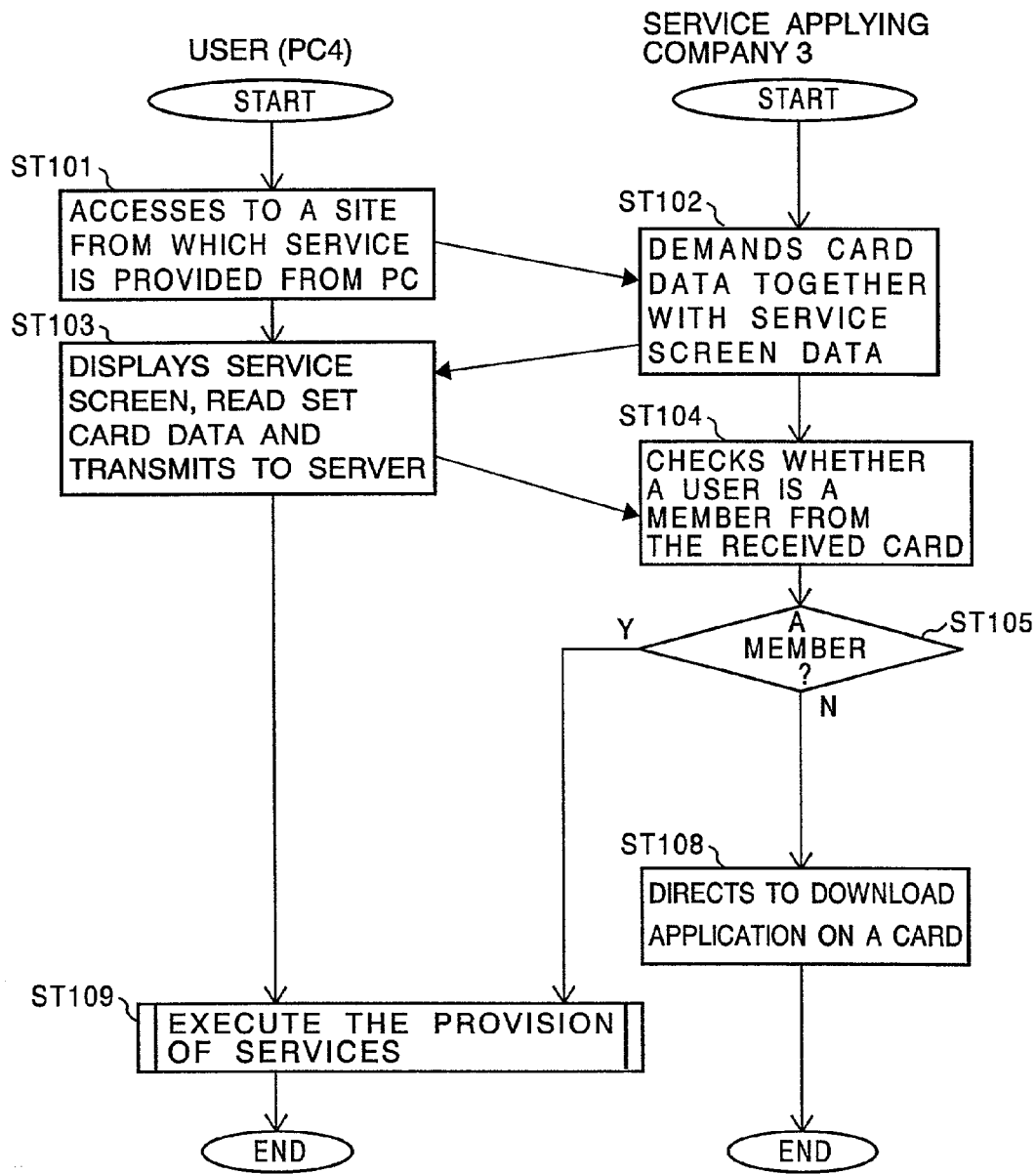
FIG. 26 is a flowchart for explaining the operation between a user's PC and a service applying company regarding the service providing process.

As shown in FIG. 26, user B first sets an IC card 6 with a downloaded application (hereinafter, a main card 6a and an affiliated card 6b are included in the explanation) in the IC card reader/writer 5. User B accesses the site of the service applying company 3 using his own PC 4 to get services (ST101). In response to the access from the PC 4, a file controller 36 of the service applying company 3 transmits service screen data and a demand for data of a using card to the PC 4 (ST102).

The PC 4 displays the received service screen data on a display. Further, the certification data on the set IC card 6 is read by the IC card reader/writer 5 and notifies of it to the service applying company 3 via the PC 4 (ST103).

When receiving the notification of the card identification data from the PC 4, the file controller 36 of the service applying company 3 checks whether the user accessed is a member by searching the database for user registration based on the received card identification data (ST104).

When the accessed user is judged to be a member in Step ST104 (ST105: YES), services that are described later are provided (ST109). When the accessed user is judged to not be a member in Step ST104 (ST105: NO), the controller 36 notifies the user B to download a service providing application on the card and execute the member registration (ST108).

Figure 27:
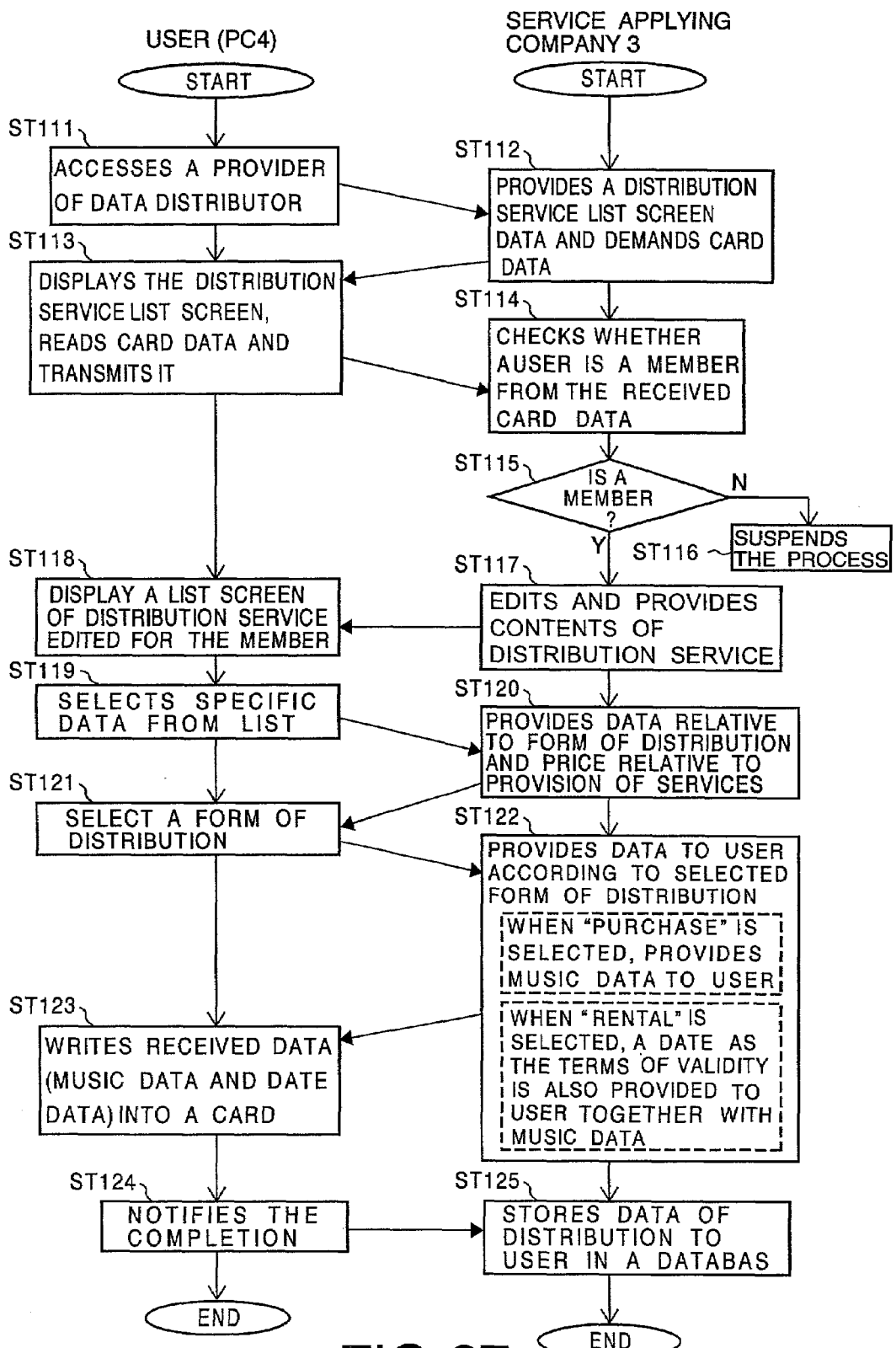
FIG. 27 is a flowchart for explaining the operation between a user's PC and a service applying company regarding the service providing process relative to data distribution.

FIG. 27–FIG. 29 are a flowchart and diagrams one example of the service providing process explained in FIG. 26.

As shown in FIG. 27, user B first sets an IC card 6 with an application downloaded (hereafter both a main card 6a and an affiliated card 6b are included in the explanation) to the IC reader/writer 5. And user B accesses the site of the service applying company 3 which is a data distribution company using his own PC 4 (ST111).

In response to the access from the PC 4, the file controller 36 of the service applying company 3 transmits the distribution service list screen data shown in FIG. 28A and a demand for the card information to be used to the PC 4 (ST112).

The PC 4 displays the received list screen data on a display. Further, the certification data of the set IC card 6 is read by the IC card reader/writer 5 and notified to the service applying company 3 via the PC 4 (ST113).

When the notice of the card identification data is received from the PC 4, the file controller 36 of the service applying company 3 searches the user registration database 35 based on the received card identification data and checks whether the accessed user is a member (ST114). When the user is judged to not be a member in Step ST104 (ST115: NO), a screen to urge the member's registration is shown on the display of PC 4 and a series of processing steps is terminated (ST116).

When the user is judged to be a member in Step ST114 (ST115: YES), the file controller 36 edits contents of the distribution service in a user list creation part 38 based on the member data pre-registered on the user registration database 35. Then, the edited distribution service list screen as shown in FIG. 28B is transmitted (ST117).

The PC 4 displays the received list screen data on the display and urges the user B to select a desired specific data (ST118). When the user B selects a desired data from the displayed list screen, the PC 4 notifies the selected data to the service applying company 3 (ST119).

When the selected data is received, the file controller 36 of the service applying company 3 transmits the distribution form for providing the service and the list screen data relative to prices shown in FIG. 29 to the PC 4 (ST120).

The PC 4 displays the received list screen data on the display and urges the user B to select a desired distribution form. When the user B selects a desired distribution form from the displayed list screen, the PC 4 notifies the selected data to the service applying company 3 (ST121).

Here, in this embodiment, two forms of the "Purchase" or "Rental" of the selected data are shown as the distribution form. In the case of the rental, it is so set that when the prescribed rental period is over, the provided data will no longer be used.

When the data selected in Step ST121 is received, the file controller 36 of the service applying company 3 transmits the data selected in Step ST119 to the PC 4 corresponding to the selected distribution form. At this time, when "Purchase" is selected, the selected data (for example, music data) only is provided to the user B. Further, when "Rental" is selected, at least the date information is provided to the user B as the terms of validity in addition to the selected data (for example, music data) (ST122).

In the PC 4, the data sent from the service applying company 3 (for example, music data only or music information plus the date information, etc.) is written into the IC card 6 that is set via the IC card reader/writer 5(ST123). When the writing of the provided data is completed normally in Step ST123, the PC 4 notifies the service applying company 3 of the normal completion of the data writing (ST124). When the notice of completion is received from the PC 4, the service applying company 3 stores the distribution information provided this time in the user registration database 35 for the user's registration, and completes a series of processing steps (ST125).

In this embodiment, when the service applying company 3 is accessed and a prescribed application is downloaded, it is judged whether the user is a member having the right to receive the service based on the data from the IC card. Therefore, for the user it is possible to notify that the user is a member without performing such complicated steps as the input of individual data, etc. For the service applying company it is possible to prevent illegal (impersonate) access.

Further, in this embodiment, when a user is judged to be a member based on the data from an IC card, the contents of the distribution service are automatically edited and provided based on the personal data at the time of member registration or accumulated through the service provided in the past. Therefore, for a user it is possible to efficiently select a highly desirable service or a lot of services be provided.

Further, in this embodiment, there are two types of service distribution forms; "Purchase" form to provide distribution data indefinitely and "Rental" form to provide distribution data with the restricted term. When the "Rental" form is selected, distribution data is provided with the usable date information attached. Therefore, for a user it is possible to use the latest data for a prescribed period only while using a memory in restricted capacity and effectively using a less memory capacity. Further, for a service applying company it is possible to provide distribution data safely without it being improperly used.

Next, an example of the service providing process explained in FIG. 26 will be described referring to FIG. 30 and FIG. 31.

Figure 30:
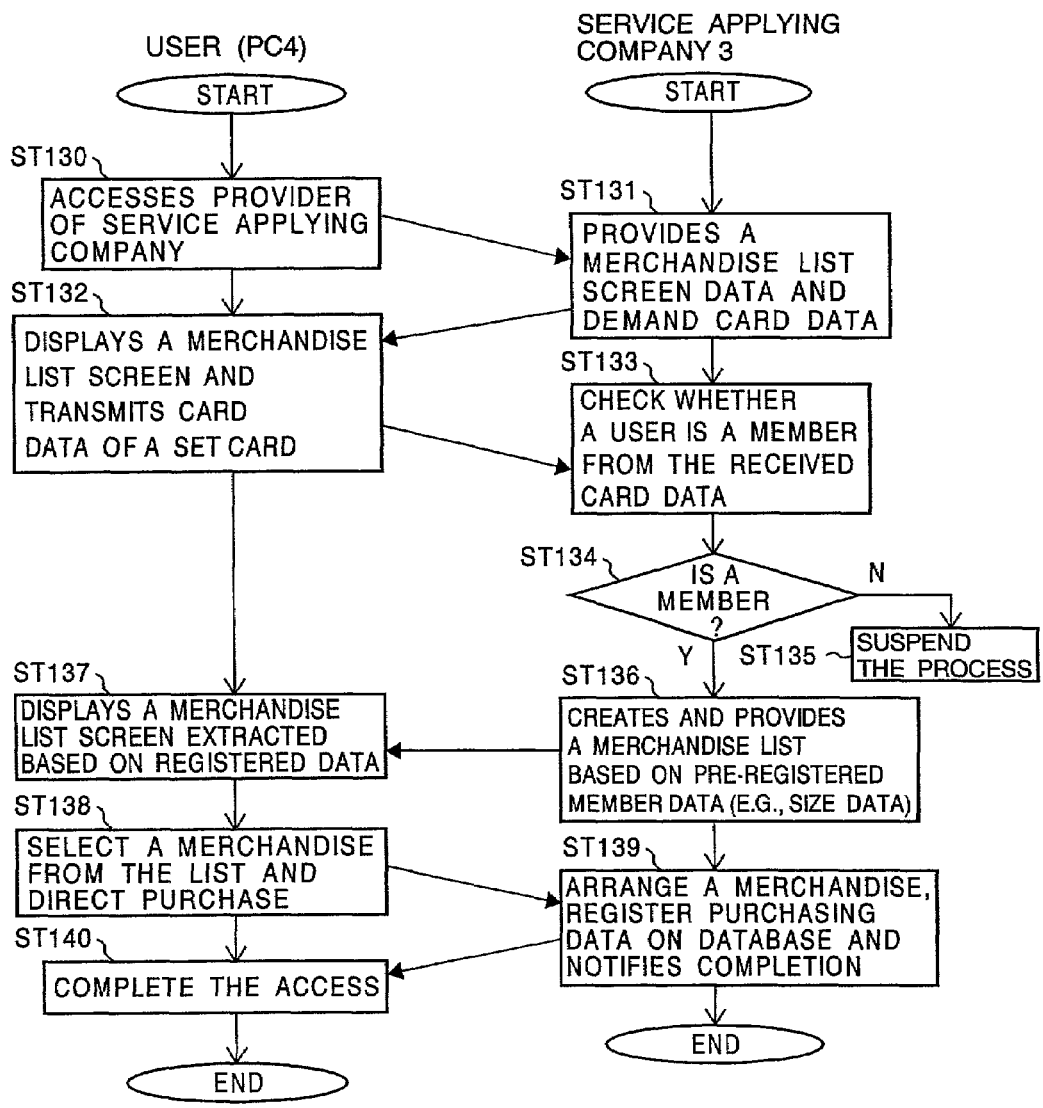
FIG. 30 is a flowchart for explaining the operation between a user's PC and a service applying company regarding the service providing process relative to merchandise purchasing.

As shown in FIG. 30, the user B first sets the IC card 6 with an application downloaded (hereafter both the main card 6a and the affiliated card 6b are included) to the IC card reader/writer 5. Then, the user B accesses the site of the service applying company 3 that provides merchandise desirable to buy using his own PC 4. (ST130).

Figures 31A, 31B, 31C:
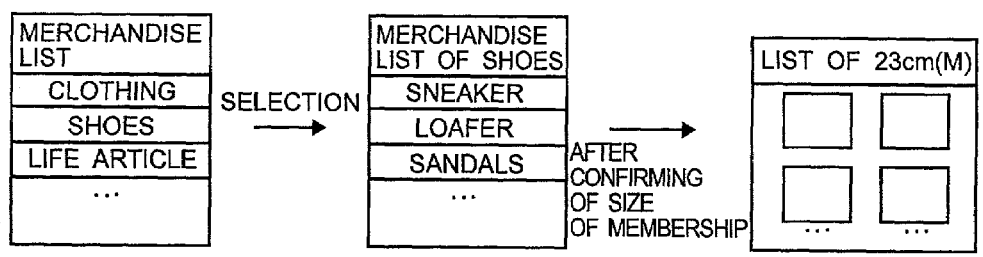
FIG. 31A–FIG. 31C are diagrams showing data on the merchandise list screens.

In response to the access from the PC 4, the file controller 36 of the service applying company 3 transmits the demand for the merchandise list screen data as shown in FIG. 31A and FIG. 31B, and the card data to be used to the PC 4 (ST131).

The PC 4 displays the received list screen data on the display. Further, the PC 4 reads the certification data of the IC card 6 that is set by the IC card reader/writer 5 and notifies this certification data to the service applying company 3 via the PC 4 (ST132).

In response to the notice of the card identification data from the PC 4, the file controller 36 of the card applying company 3 checks whether an accessed user is a member by searching the user registration database 35 based on the received card identification data (ST133).

When a user is judged to not be a member in Step ST133 (ST134: NO), the screen urging the member's registration is shown on the display of the PC 4, and a series of processing steps is terminated (ST135).

When a user is judged to be a member in Step ST133 (ST134: YES), the file controller 36 edits the contents of the merchandise by the user list creation part 38 based on the member data (for example, size data, etc.) pre-registered in the user registration database 35. Then, the edited merchandise list screen as shown in FIG. 31C is transmitted (ST136).

The PC 4 displays the received list screen data on the display, and urges the user B to select the desired merchandise (ST137). When a merchandise is selected from this displayed list screen by the user B, the PC 4 notifies a purchase direction of the selected merchandise to the service applying company 3 (ST138).

When the selected merchandise data is received, the file controller 36 of the service applying company 3 executes the registration/delivery arrangement of merchandise directed to be purchased to a prescribed database and notifies of the completion of the registration to the PC 4 (ST139). When it is notified of the completion of the registration, the PC 4 completes the access (ST140).

Next, the outline of the process to download an IC card vote application and the vote process using the IC card with the vote application downloaded will be described using FIG. 32–FIG. 35.

Figure 32:
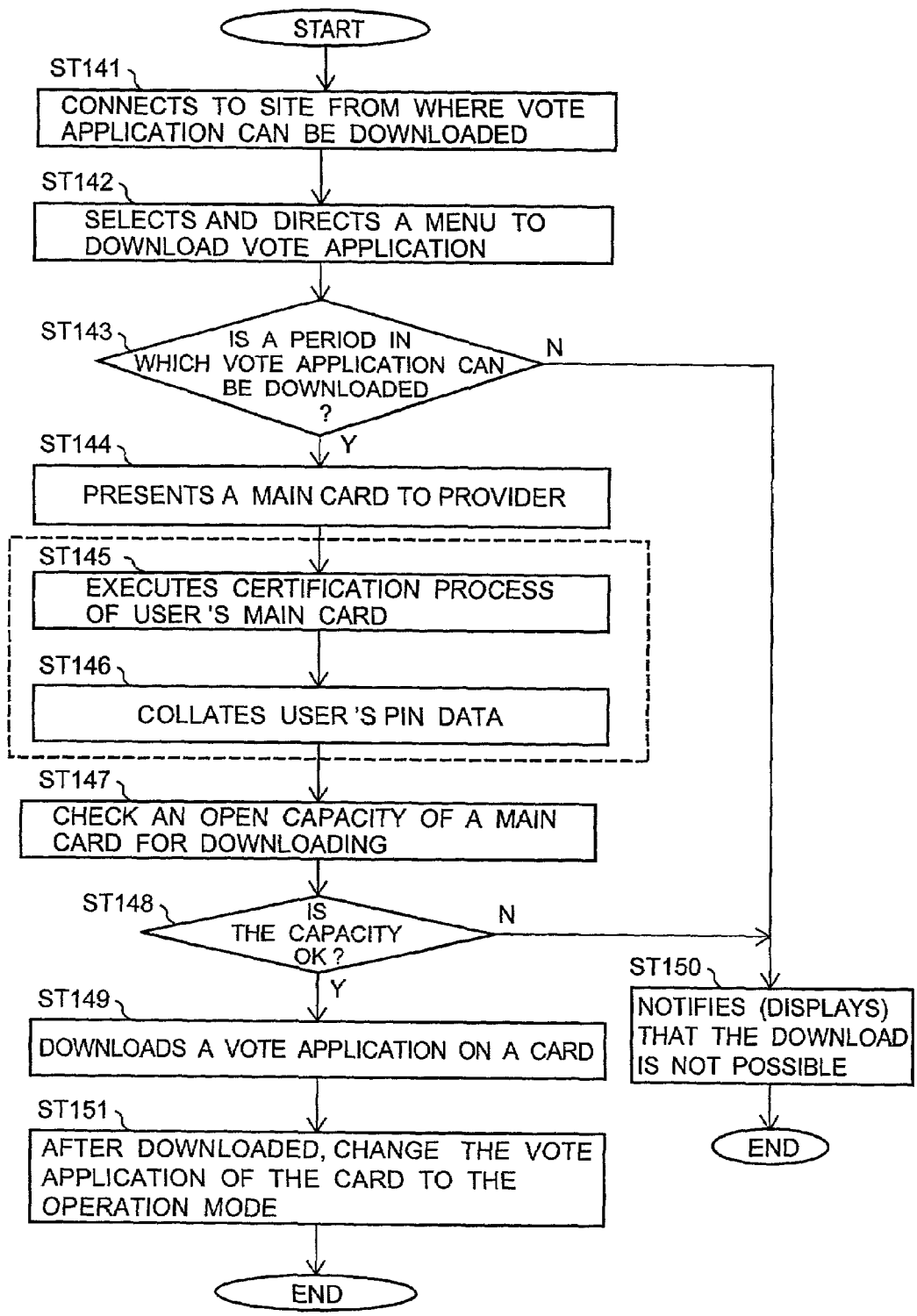
FIG. 32 is a flowchart for explaining a vote application download process to a main card.

As shown in FIG. 32, the user B first accesses the site of the application download provider 2 for downloading an application relative to the vote using his own PC 4 (ST141).

When the PC 4 is connected to the site, the download application selecting screen is transmitted to the PC 4. The user B selects a vote application desired to download from the application selection screen displayed on the PC 4, and directs it to the provider 2 (ST142).

When the direction in Step ST142 is received, the file controller 26 of the provider 2 judges whether the selected vote application is a period that can be downloaded (ST143). That is, for "Vote", a voting day (or a period) is generally pre-determined. Therefore, even when the vote application is downloaded, it becomes useless because the voting cannot be made when a vote date (a period) is over.

Therefore, in this embodiment, the period for downloading the vote application is restricted up to the day before the preset vote day (a period).

In Step ST143, the date directed for selecting the vote application downloading is judged whether it is the day before the vote day. When judged that the application cannot be downloaded in Step ST143, for example, it is after the voting day (the period), the file controller 26 of the provider 2 notifies the user B (PC4) that the application cannot be downloaded, and a series of processing steps are stopped (ST150).

Further, when judged that the application can be downloaded in that period in Step ST143, the provider 2 demands the PC 4 to present the main card 6a of the user B for the justifiability checking process. In response to the demand for presenting the main card 6a, the PC 4 reads out the certification data from the main card 6a inserted in the connected (or built-in) IC card reader/writer 5 connected (or built-in), and transmits this certification data to the provider 2 (ST144).

When the certification data is received from the PC 4, the file controller 26 of the provider 2 executes the certification process relative to the main card 6a and checks justifiability of the main card 6a (ST145). When the main card 6a is judged not proper as a result of the check in Step ST145, a series of processing steps are suspended.

When justifiability of the main card 6a is confirmed in Step ST145, the file controller 26 demands the PC 4 to present the PIN data of the user B in order to check individual justifiability of the user B (whether the voting right is retained). In response to the demand for presentation of PIN data the PC 4 urges 4 the user B to input PIN data, and transmits the PIN data input by the user B to the provider 2.

When the PIN data is received from the PC 4, the file controller 26 of the provider 2 executes the collation process relative to the PIN data, and checks individual justifiability of the user B (ST146). When the user B is judged not to be justifiable (retains no voting right) as a result of the check in Step ST146, a series of processing steps are terminated.

When it is confirmed that the user B is justifiable and has the voting right in Step ST146, the file controller 26 of the provider 2 checks whether the voting application selected in Step ST142 can be downloaded and what is the open capacity of the memory of the main card 6 (ST147). Further, the checking operation of the open capacity of the memory of the actual main card may be executed by the provider 2 or by the PC 4 6a (the IC card reader/writer 5).

When it is detected that the downloading of the application is not possible (the open capacity is insufficient) (ST148: NO) as a result of the checking of the open capacity in Step ST147, the user B (PC 4) is so notified and a series of processing steps are terminated (ST150).

When the download is judged possible (ST148: YES), the file controller 26 of the provider 2 executes the download of the selected vote application to the main card 6a of the user B. Further, the PC 4 writes the vote application program sent from the provider 2 to the main card 6a that is set by the IC card reader/writer 5 (ST149).

When the program download is completed normally in Step ST149, the PC 4 notifies a provider 2 of the normal completion of the vote application registration. When the normal completion of the registration is notified, the provider 2 sets to the usable state by setting the vote application downloaded in the main card 6 in the operation mode and terminate the application downloading process (ST151).

In this embodiment, an application relative to the voting is downloaded on the main card 6a in which an individual data registered on a public organization is pre-stored. Therefore, it is possible to prevent the illegal downloading of the vote application. Further, it is possible to overcome the geographical influence related to a voting paper, the notice of an application, etc.

Further, the period during which the vote application can be downloaded is restricted. In particular, in this embodiment, it is so constructed that a voting application can be downloaded up to the day before a voting date (period). Therefore, it is possible to prevent the system going down due to the concentrated access and minimize the influence on the voting.

Next, the modified example of the download processing shown in FIG. 32 will be explained using FIG. 33. In this embodiment, a vote application program is first downloaded to the main card 6a. Further, if the memory open capacity of the main card is insufficient and the application program cannot be downloaded, the application program is downloaded on the affiliated card 6b.

Further, it is also possible to set an affiliated card 6b from the beginning and download the application program on the affiliated card 6b. Further, up to the certification process of the main card 6a in Step ST145 and the PIN collation process of the user B in Step ST146, the processes are the same as those in the embodiment shown in FIG. 32 and therefore, the explanation thereof will be omitted.

Figure 33:
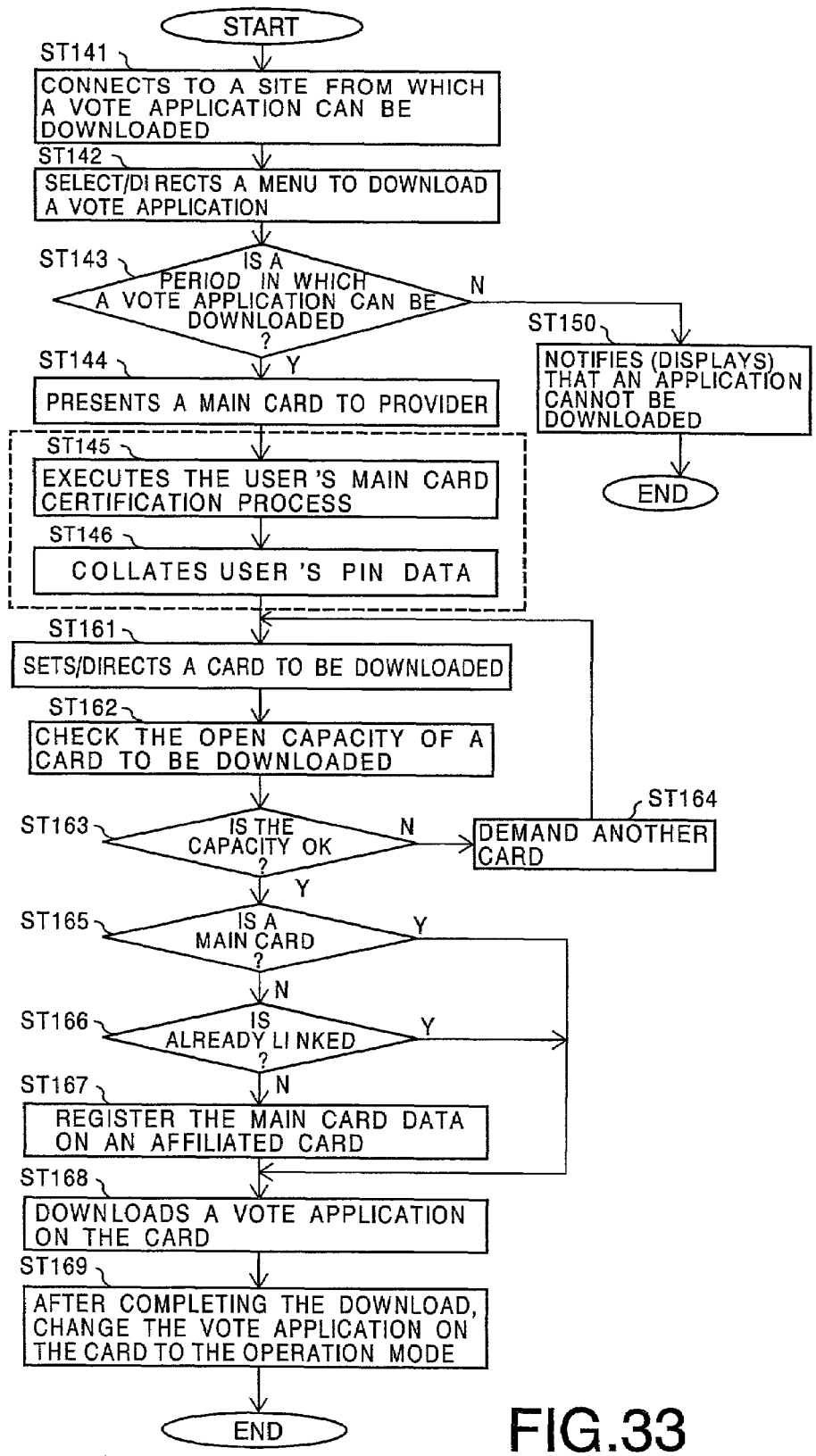
FIG. 33 is a flowchart for explaining a modified example of the vote application download process to an IC card.

That is, when the site of the application download provider 2 is accessed (ST141), the vote application desired for downloading is selected, and the period is that in which the vote application can be downloaded, the certification process of the main card 6a (ST145) and the collation process of the user B (ST146) are executed and the step proceeds to the process shown in FIG. 33.

When justifiability of the main card 6a is confirmed in ST145 and justifiability of the user B checked confirmed in ST146 as shown in FIG. 33, a provider's 2 file control part 26 will require the setting of the card for application download from PC4 (ST161).

The open capacity of the memory of the set IC card 6 is checked to see whether the vote application chosen selected in Step ST142 can be downloaded (ST162). Further, the open memory capacity of the actual IC card 6 may be checked by the provider 2 or the PC 4 (IC card reader/writer 5).

When it is judged that the vote application cannot be downloaded in Step ST162 (ST163: NO), the file controller 26 of the provider 2 transmits a demand to set another card to the PC 4 (ST164). When receiving a demand to set another card for downloading due to insufficient memory capacity, the PC 4 displays it on the display and urges the user B to insert another card. When another IC card is set, the memory capacity of the set IC card is checked similarly (ST162).

When it is judged possible to download the vote application in Step ST162 (ST163: YES), the file controller 26 of the provider 2 judges whether the set IC card 6 is the main card 6a (ST165). Further, when it is judged in Step ST165 that the set card is not the main card 6a (ST165: NO), the card is further checked to determine whether it is an affiliated card 6b that was already link processed with the main card 6a (ST166).

When judged that the card is not a link processed affiliated card 6b in Step ST166 (ST166: NO), the file controller 26 of the provider 2 creates link data based on the certification data of the already certified main card 6a in ST145 and transmits the data to the PC 4. When the link data is received from the provider 2, the PC 4 writes the link data onto the IC card 6 set in the IC card reader/writer 5 and executes the link process of the affiliated card 6b (ST167).

When the IC card 6 set for the downloading is judged as the main card 6a in Step ST165 (ST165: YES), the set. IC card 6 is judged as the affiliated card 6b that was already link processed with the main card 6a in Step ST166 (ST166: YES) and the link data was normally written in Step ST167, the file controller 26 of the provider 2 executes the downloading of the vote application (ST168).

Then, when the program download is completed in Step ST168, the file controller 26 of the provider 2 makes the application program downloaded in the IC card 6 usable by setting the application program to the operation mode (ST169).

In this embodiment, the vote application is downloaded in not only the main card 6a storing individual data but also in a general purpose IC card 6. As a result, the usage range of a single sheet of an IC card (the main card 6a) in less memory capacity is not restricted and more services can be provided to users.

Next, the outline of the voting process by the IC card with the vote application downloaded will be described referring to FIG. 34 and FIG. 35.

Figure 34:
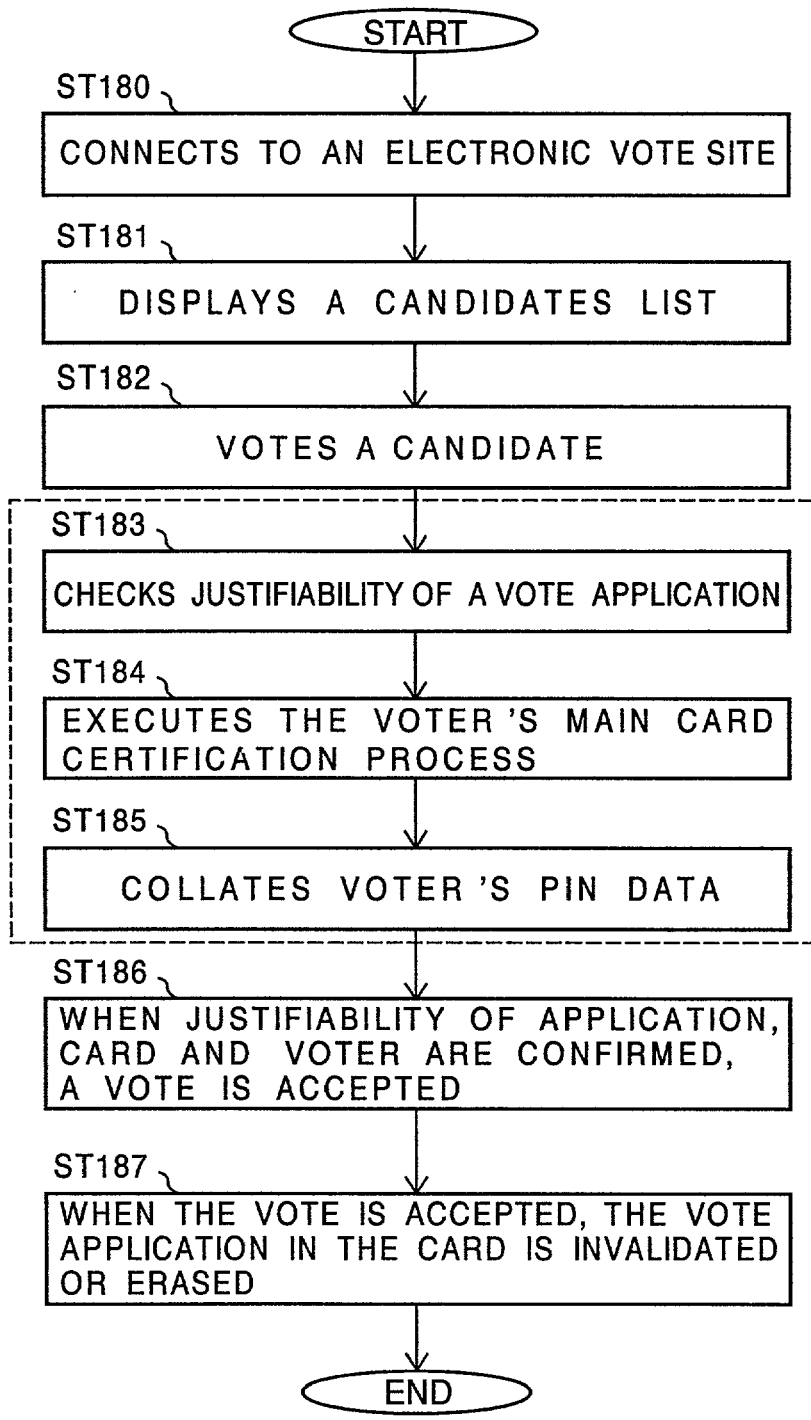
FIG. 34 is a flowchart showing the outline of a vote process using an IC card with a vote application downloaded.

As shown in FIG. 34, the user B first sets an IC card with the vote application downloaded (hereinafter, both the main card 6a and the affiliated card 6b are included in the explanation) to the IC card reader/writer 5. Then, the user B accesses the site of the vote server 3 for making the voting using his own PC 4 (ST180). In response to the access from the PC 4, the file controller 36 of the vote server 3 transmits the information on a candidates list screen to the PC 4 (ST181).

The data of the received candidates list screen is displayed on a display. When a candidate is selected by the user from the input portion of the PC 4, the PC 4 reads out the data relative to the vote application of the IC card 6 set by the IC card reader/writer 5, and notifies (the voting) data of the selected candidate and the identification data of the card 6 to the vote server 3 (ST182).

In the vote server 3, justifiability of the vote application program is checked from the data regarding the received vote application (ST183). When justifiability of the application program is confirmed, in order to check whether the main card 6a has the voting right, the certification process is executed using the main card 6a (ST184).

When the main card 6a is judged to be the right card in Step ST184, the PIN collation process is executed to check whether a user (voter) is a proper owner of the main card 6a (ST185). When all of the vote application program, the main card 6a and user (voter) B are confirmed to be justifiable as described above, the vote server 3 accepts the vote formally based on the candidate data received in Step ST182 (ST186).

When the vote is formally accepted in Step ST186, the vote server 3 invalidates (eliminates, etc.) the vote application from the IC card 6 with the vote application downloaded so that the vote application is no longer used (ST187).

Figure 35:
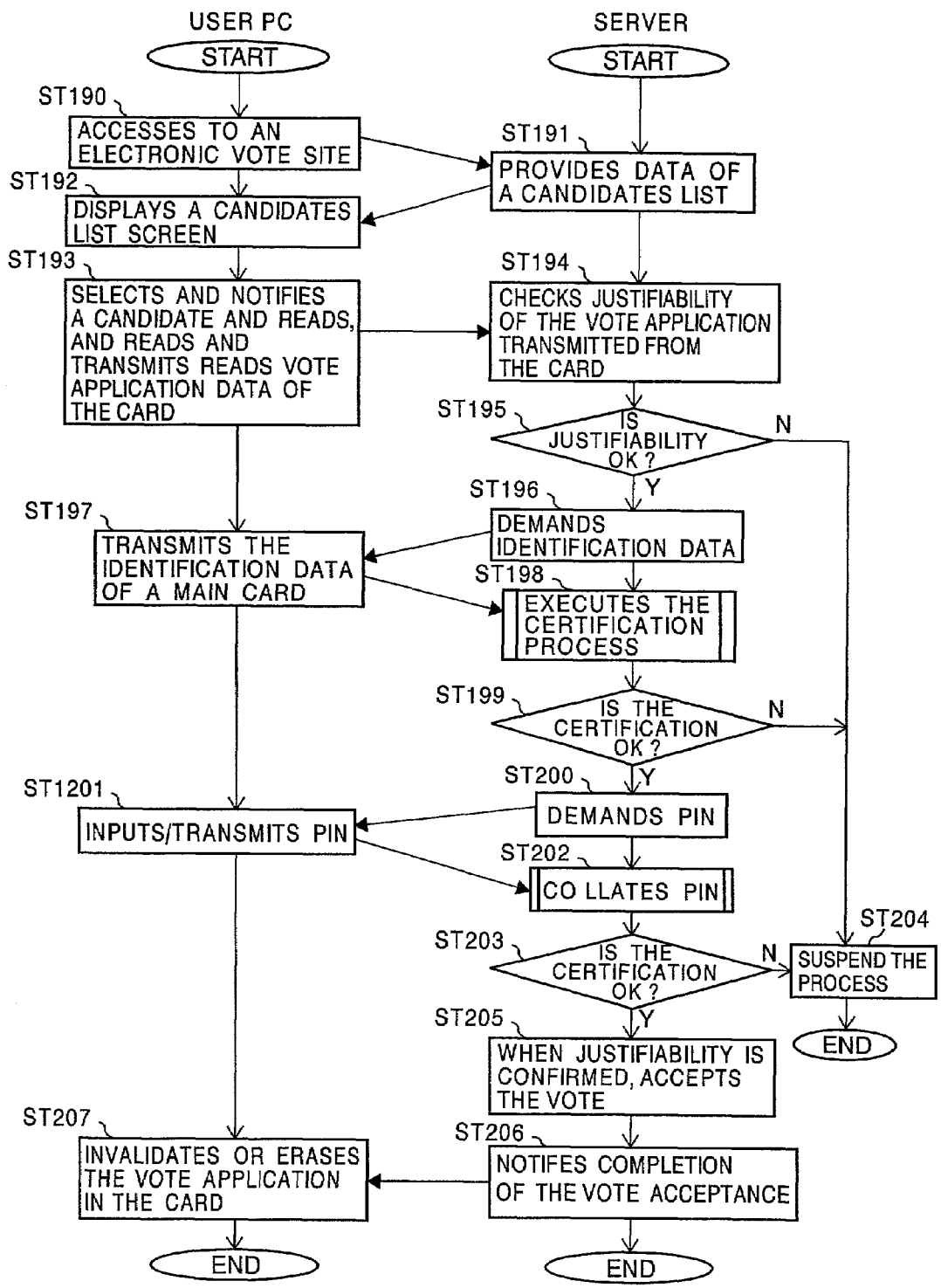
FIG. 35 is a flowchart for explaining the operation between a user's PC and a vote server 3.

As shown in FIG. 35, user B first sets the application downloaded IC card 6 (hereinafter, both the main card 6a and the affiliated card 6b are included in the explanation) to the IC card reader/writer 5. Then, user B accesses the electronic voting site of the vote server 3 using his own PC 4 (ST190).

In response to the access from the PC 4, the file controller 36 of the vote server 3 transmits a demand for the candidate list screen data and the card data that is used as I.D. to the PC 4 (ST191).

The PC 4 displays the data of the received candidate list screen on the display, and urges user B to select (vote) a candidate (ST192). Further, the certification data of the vote application loaded in the IC card 6 set by the IC card reader/writer 5's integrated circuit card R/W5 is read. When a candidate data is selected from the displayed list screen (not shown) by the user B, the PC 4 notifies the vote server 3 of the selected candidate data and the application certification data of the IC card (ST193).

The file controller 36 of the vote server 3 stores the received candidate data temporarily and checks the certification data of the received vote application to see whether it is a proper application (ST194). Here, when it is judged that the vote application is not a proper application (ST195: NO), a series of processing steps are stopped (ST204). When it is judged to be improper (ST195: YES), the file controller 36 of the vote server 3 will demands the card identification data from the PC 4 (ST196).

In response to the demand in Step ST196, the card identification data stored in the IC card 6 set by the IC card reader/writer 5 is read and transmitted to the vote server 3 via the PC 4 (ST197). When the certification data is received from the PC 4, the file controller 36 of the vote server 3 executes the certification process relative to the IC card 6, and checks justifiability of the IC card 6 (ST198). When the IC card 6 is judged to be not proper as a result of the check in Step ST198 (ST199: NO), a series of processing steps are stopped (ST204).

When justifiability of the IC card 6 is confirmed in Step ST198 (ST199: YES), the file controller 36 of the vote server 3 demands the PC 4 to present PIN data of the user B for checking justifiability of the user B (ST200).

When the demand for presenting the PIN data is received, the PC 4 urges the user B to input the PIN data. When the PIN data is input through a keyboard (not shown) by the user B, the PC4 transmits the input PIN to the vote server 3 (ST201).

When the PIN data is received from the PC 4, the file controller 36 of the vote server 3 executes the collation process relative to the PIN information, and checks justifiability of the user B (ST202). When the user B is judged to be not justifiable as a result of the check in Step ST202 (ST203: NO), a series of processing steps are stopped (ST204).

When justifiability of the user B is confirmed in Step ST202 (ST203: YES), the file controller 36 of the vote server 3 formally accepts the candidate data that was received and stored temporarily in Step ST194 (ST205). When the vote acceptance is completed, the PC 4 is notified of the completion of the vote acceptance (ST206).

When the notice of the vote acceptance completion is received, the PC 4 invalidates the vote application in the IC card 6 that is set by the IC card reader/writer 5 (ST207). Particularly, as an invalidation process of the applications downloaded in the IC card 6, it is considered to eliminate the vote application program in the IC card 6 with the IC card reader/writer 5. Further, it is also considered to rewrite a flag, etc. so that the vote application program in the IC card 6 is considered unusable by the IC card reader/writer 5.

In this embodiment, when all of the application program, the master card 6a retained by the voter and the voter are confirmed justifiable, the vote is formally accepted. Therefore, it is possible to prevent illegal voting.

In this embodiment, when the vote is formally accepted, the IC card with the vote application program downloaded is applied with the process to invalidate the vote application. Accordingly, the vote can be made only one time and the illegal voting can be prevented.

As described above, according to the present invention, it is possible to obtain an individual specific card easily and to download plural applications in a single card as desired by a card holder.

What is claimed is:

1. A method for providing services to a holder of a first portable electronic device via a terminal device that handles the first portable electronic device, based on the first portable electronic device having a memory storing application data relative to a service provision and pre-storing individual data of the holder by a prescribed organization, the method comprising:

checking justifiability of the first portable electronic device based on the individual data stored in the first portable electronic device when a directive data for downloading an application is received from the terminal device;

demanding a setting of a portable electronic device to download the application data when the first portable electronic device is confirmed to be justifiable;

reading out application data desired by the holder from the memory when receiving data showing a completion of setting of the first portable electronic device or a second portable electronic device of the holder differing from the first portable electronic device as the portable electronic device, in which an application is downloaded, is received from the terminal device; and transmitting the read application data to the terminal device by directing download of the application to the portable electronic device, wherein the reading includes judging whether the set portable electronic device is the first portable electronic device or the second portable electronic device differing from the first portable electronic device when the data showing the completion of the setting of the portable electronic device to which an application is downloaded is received, wherein the reading includes creating data relative to the individual data stored in the first portable electronic device and directing to store said data relative to the individual data in the second portable electronic device when the set portable electronic device is judged to be the second portable electronic device in said judging; and wherein, when the set portable electronic device is judged to be the first portable electronic device in said judging or when the data showing the completion of storage of relative data in the second portable electronic device is received, reading out application data desired by the holder from the memory.

2. The method according to claim 1, further comprising:

demanding a provision of data including at least individual data stored in the portable electronic device when a provision of service using the portable electronic device is directed by the terminal device;

checking whether the holder has a right to receive the services based on the data stored in the portable electronic device when the data is received;

providing service data desired by the holder when the holder is judged to have the right to receive the services as a result of the above checking; and informing the terminal device to execute the download of an application required for receiving the service when the holder is judged to have no right to receive the services as a result of the above checking.

3. The method according to claim 2, further comprising:

presenting desired services to the holder in a first form to provide service data at a first price indefinitely and a second form to provide service data at prices lower than the first price for a limited period; and directing a download of service data to the portable electronic device when the first form is selected when the service data providing forms are presented and directing the download of service data and data relative to the limited period to the portable electronic device when the second form is selected.

4. The method according to claim 1, wherein the transmitting includes:

transmitting the read out application data in an unusable state; and changing the application downloaded in the portable electronic device from the unusable state to a usable state when the data showing a normal completion of the download is received after transmitting the application data.

5. The method according to claim 1, further comprising:

checking whether it is possible to download an application data desired by the holder relative to a memory capacity of the set first or second portable electronic device when the data showing the completion of the setting of the first portable electronic device or the second portable electronic device differing from the first portable electronic device is received as a portable electronic device to which the application is downloaded;

demanding a setting of another portable electronic device for downloading the application data when the download is judged being not possible as a result of the capacity checking; and reading the application data and transmitting the read application when the download is judged to be possible.

6. A system for providing services to a holder of a first portable electronic device via a terminal device handling the first portable electronic device using the first portable electronic device pre-storing at least individual data of the holder by a prescribed organization, comprising:

storing means for storing application data relative to a provision of services;

receiving means for receiving a direction for downloading an application from the terminal device and various data transmitted from the holder;

justifiability check means for checking justifiability of the first portable electronic device based on the individual data stored in the first portable electronic device received by the receiving means when the direction for downloading the application is received by the receiving means;

setting demand means for demanding a setting of a portable electronic device to download application data when the first electronic device is confirmed to be justifiable by the justifiability check means;

means for reading application data desired by the holder from the storing means when data showing a completion of the setting of the first portable electronic device or a second electronic device of the holder differing from the first electronic device as the portable electronic device for downloading applications is received by the receiving means; and means for transmitting the application data read by the reading means by directing a download of the application for the set portable electronic device to the terminal device, wherein the means for reading application data includes means for judging whether the set portable electronic device is the first portable electronic device or the second portable electronic device differing from the first electronic device when the data showing the completion of the setting of a portable electronic device to download application is received by the receiving means, wherein the means for reading application data includes means for creating information relative to the individual data stored in the first portable electronic device and directing storage of the data relative to the individual data in the second portable device when the second portable device is judged by the judging means as the second portable electronic device, and wherein the reading of an application desired by the holder from the memory is executed when the set portable electronic device is judged by the judging means to be the first portable electronic device or when the data showing a completion of the storage of relative data in the second portable electronic device is received by the receiving means.

7. The system according to claim 6, further comprising:

provision demanding means for demanding provision of data including at least individual data stored in the portable electronic device when the provision of services using the portable electronic device is directed by the terminal device;

holder checking means for checking whether the holder of the portable electronic device has the right to receive the service based on the data stored in the portable electronic device when the data stored in the portable electronic device is received in response to the demand by the provision demanding means;

means for providing service data desired by the holder of the portable electronic device when the holder is judged to have the right to receive services by the holder checking means; and means for advising the holder of the portable electronic device to download an application required for receiving the service when the holder is judged to have no right to receive the services checked by the checking means.

8. The system according to claim 7, wherein the service providing means includes:

means for presenting desired services in a first form to provide service data at a first price indefinitely and a second form to provide service data at prices lower than the first price for a limited period in connection with the provision of service data desired by the holder; and means for directing a download of service data to the portable electronic device when the first form is selected when the service data providing forms are presented by the presenting means and directing the download of service data and data relative to the using period to the portable electronic device when the second form is selected.

9. The system according to claim 6, wherein the transmitting means includes:

means for transmitting the application data read by the reading means in an unusable state; and means for changing the application downloaded in the portable electronic device from the unusable state to a usable state when the data showing a normal completion of the download is received by the receiving means after transmitting the application data by the transmitting means.

10. The system according to claim 6, further comprising:

capacity checking means for checking a storage capacity of the set first or second portable electronic device to determine whether application data desired by the holder can be downloaded when the data showing the completion of setting of the first portable electronic device or the second electronic device differing from the first electronic device is received by the receiving means as a portable electronic device to download the application;

wherein the application data is read by the reading means when it is judged by the capacity checking means that the application can be downloaded, the transmission of the application by the transmitting means is executed and when the download is judged not feasible by the capacity checking means, another portable electronic device is set by the setting demand means.

11. A method for providing services to a holder of a portable electronic device via a terminal device that handles the portable electronic device based on the portable electronic device having a memory storing application data relative to provision of services and pre-storing at least individual data of the holder by a prescribed organization, comprising:

checking justifiability of the portable electronic device based on the individual data stored in the portable electronic device when a download direction is received from the terminal device;

judging whether the holder has the right to vote from the individual data stored in the portable electronic device when the portable electronic device is confirmed to be justifiable;

reading the application data relative to the vote from the memory when the holder is judged to have the voting right;

directing the terminal device to download an application relative to the vote to the portable electronic device and transmitting the read application data relative to the vote; and accepting the accessed application data relative to the vote using the portable electronic device with the application relative to the vote downloaded.

12. The method according to claim 11, further comprising:

judging whether a date or time data when the download of application is directed is within a pre-set period for downloading the application when the direction for downloading the application is received from the terminal device;

wherein said checking is executed when it is judged that the application can be downloaded in the period.

13. A method according to claim 11, wherein the reading includes:

demanding a setting of a portable electronic device to which the application data relative to the vote is downloaded when the holder is judged to have the voting right;

judging whether the set portable set electronic device is a first portable electronic device or a second portable electronic device differing from the first portable electronic device when information showing a completion of the setting of the portable electronic device to which an application is downloaded is received; and creating data relative to the individual data stored in the first portable electronic device, transmitting the data relative to the individual data and directing to store the data relative to the individual data in the second portable electronic device when the set portable electronic device is judged to be the second portable electronic device as a result of the judgment;

wherein the application data relative to the vote is read from the memory when the set portable electronic device is judged to be the first portable electronic device as a result of the judging or when the information of a completion of storage of the relative data in the second portable electronic device is received.

14. The method according to claim 11, wherein the accepting includes:

checking justifiability of the portable electronic device based on the individual data stored in the portable electronic device and checking whether the application data relative to the vote is downloaded when the voting directive data by the holder is received;

checking justifiability of the holder based on a code data of the holder when the first portable electronic device is judged to be justifiable and it is confirmed that the application is downloaded in the checking step; and accepting the application data relative to the vote received by the receiving means when the holder is confirmed to be justifiable by the checking step.

15. The method according to claim 11, further comprising:

directing an invalidation of the application data relative to the vote downloaded in the portable electronic device by changing it to an unusable state when the acceptance of the application data relative to the vote is completed in the accepting.

16. A system for providing services to a holder of a portable electronic device via a terminal device that handles the portable electronic device using the portable electronic device pre-storing at least the individual data of the holder by a prescribed organization, comprising:

means for storing application data relative to a vote to be provided;

means for receiving a directive data of the downloading of an application relative to the vote and the individual data stored in the portable electronic device by the terminal device;

means for checking justifiability of the portable electronic device based on the individual data stored in the portable electronic device received by the receiving means when the directive data for the download is received by the receiving means;

means for judging whether the holder of the portable electronic device has the right to vote from the individual data stored in the portable electronic device when the portable electronic device is confirmed to be justifiable by the checking means;

means for reading the application data relative to the vote from the memory when the holder is judged to have the voting right by the voting right judging means;

means for directing the terminal device to download the application relative to the vote to the portable electronic device and transmitting the application data relative to the vote that is read by the reading means; and means for accepting the application data relative to the vote that is accessed using the portable electronic device to which the application relative to the vote is downloaded.

17. The system according to claim 16, wherein the checking means includes:

means for judging whether the directed downloading is within a pre-set downloading period which is judged from the date or time information directing the download when the direction is received by the receiving means; and means for checking justifiability of the portable electronic device based on the individual data stored in the portable electronic device received by the receiving means when the directed downloading is judged by the means for judging whether the directed downloading is within the pre-set downloading period as being within the period during which the download can be made.

18. The system according to claim 16, wherein the reading means includes:

means for demanding a setting of the portable electronic device to which the application data is downloaded when the holder of the portable electronic device is judged to have the voting right by the vote right judging means;

means for judging whether the set portable electronic device is a first portable electronic device or a second portable electronic device differing from the first electronic device when the information showing the completion of setting of the portable electronic device to which an application is downloaded is received by the receiving means; and means for creating data relative to the individual data stored in the first portable electronic device, transmitting the created relative data and directing to store the relative data in the second portable electronic device;

wherein when the set portable electronic device is judged to be the first portable electronic device by the judging means or when the information showing a completion of the storage of relative data in the second portable electronic device is received by the receiving means, the application data desired by the holder is read from the storing means.

19. The system according to claim 16, wherein the accepting means includes:

first checking means for checking justifiability of the portable electronic device based on the data received by the receiving means and stored in the portable electronic device when the vote directive data is received by the receiving means;

second checking means for checking whether the application relative to the voting is downloaded based on the data received by the receiving means and stored in the portable electronic device when the voting directive data is received by the receiving means; and third checking means for checking justifiability of the holder based on the code data of the holder received by the receiving means when the voting directive data is received by the receiving means;

wherein when the first checking means confirms that the portable electronic device is confirmed to be justifiable, the second checking means confirms that the application is downloaded, and the third checking means confirms that the holder is justifiable, the data relative to the vote received by the receiving means is accepted.

20. The system according to claim 16, further comprising:

means for directing an invalidation of the application relative to the voting that is downloaded on the portable electronic device by changing the application to the unusable state when the accepting of the data relative to the voting is completed by the accepting means.

* * * * *

UNITED STATES PATENT AND TRADEMARK OFFICE
CERTIFICATE OF CORRECTION

PATENT NO.        : 7,207,482 B2
APPLICATION NO.   : 09/977218
DATED             : April 24, 2007
INVENTOR(S)       : Tanaka It is certified that error appears in the above-identified patent and that said Letters Patent is hereby corrected as shown below:

On the Title Page, Item (30)
Please add the following to the title page:

--(30) Foreign Application Priority Data

June 11, 2001 (JP)   ................. 2001-174964--

Signed and Sealed this

Twenty-first Day of August, 2007

JON W. DUDAS
*Director of the United States Patent and Trademark Office*